US012640102B2

(12) United States Patent
Kim et al.

(10) Patent No.: US 12,640,102 B2
(45) Date of Patent: May 26, 2026

(54) DRIVING CIRCUIT AND DISPLAY DEVICE INCLUDING THE SAME, AND ELECTRONIC DEVICE

(71) Applicant: Samsung Display Co., Ltd., Yongin-Si (KR)

(72) Inventors: Kyung Ho Kim, Yongin-si (KR); Na Hyeon Cha, Yongin-si (KR); Sang Yong No, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 19/023,306

(22) Filed: Jan. 16, 2025

(65) Prior Publication Data

US 2025/0391373 A1 Dec. 25, 2025

(30) Foreign Application Priority Data

Jun. 21, 2024 (KR) ........................ 10-2024-0081182
Aug. 14, 2024 (KR) ........................ 10-2024-0109307

(51) Int. Cl.
*G09G 3/30* (2006.01)
*G09G 3/32* (2016.01)
*G09G 3/3266* (2016.01)

(52) U.S. Cl.
CPC ............. *G09G 3/3266* (2013.01); *G09G 3/32* (2013.01); *G09G 2300/0819* (2013.01); *G09G 2310/0267* (2013.01); *G09G 2310/08* (2013.01); *G09G 2320/0257* (2013.01); *G09G 2330/021* (2013.01)

(58) Field of Classification Search
CPC ..................... G09G 3/3266; G09G 2310/0267
See application file for complete search history.

(56) References Cited

U.S. PATENT DOCUMENTS 11,996,026 B1 5/2024 Kim et al.
2022/0020327 A1 * 1/2022 Cho ..................... G09G 3/3266
2023/0133704 A1 * 5/2023 Gai .......................... G09G 3/20
345/691

FOREIGN PATENT DOCUMENTS

KR 10-2024-0068866 A 5/2024

* cited by examiner

*Primary Examiner* — Sanghyuk Park
(74) *Attorney, Agent, or Firm* — Innovation Counsel LLP

(57) ABSTRACT

A driving circuit includes an emission driver including emission stage circuits, a compensation driver including compensation stage circuits to generate a compensation scan signal, an initialization driver including initialization stage circuits to generate an initialization scan signal, and an output controller including control stage circuits having a first control transistor and a second control transistor, which are connected in series between a main power input terminal and an output terminal, and a third control transistor and a fourth control transistor, which are connected in series between the output terminal and a second power input terminal. Each of the emission stage circuits may include an emission output unit outputting an emission control signal in response to a voltage of each of a first node and a second node, and a first emission transistor connected between a third node and an input terminal.

22 Claims, 18 Drawing Sheets

130: 132, 134, 136, 138

DRIVING CIRCUIT AND DISPLAY DEVICE INCLUDING THE SAME, AND ELECTRONIC DEVICE

CROSS-REFERENCE TO RELATED APPLICATION

The present application claims priority under 35 U.S.C. § 119(a) to Korean patent application No. 10-2024-0081182 filed on Jun. 21, 2024 and Korean patent application No. 10-2024-0109307 filed on Aug. 14, 2024 in the Korean Intellectual Property Office, the entire contents of which are incorporated herein by reference.

BACKGROUND

1. Technical Field

The present disclosure generally relates to a driving circuit and a display device including the same, and an electronic device.

2. Related Art

As the information society advances, demands for display devices for displaying images have increased in various forms. For example, the display devices have been applied to various electronic devices such as smartphones, digital cameras, laptop computers, navigation systems, and smart televisions.

Recently, efforts to reduce power consumption of the display devices have been ongoing.

SUMMARY

Embodiments according to the present disclosure provide a driving circuit and a display device including the same, and an electronic device, which can reduce power consumption.

According to an embodiment of the present disclosure, a driving circuit includes an emission driver including a plurality of emission stage circuits, wherein each of the plurality of emission stage circuits includes an emission output unit outputting an emission control signal in response to a voltage of each of a first node and a second node, and a first emission transistor connected between a third node electrically connected to the first node and an input terminal, a compensation driver including a plurality of compensation stage circuits to generate a compensation scan signal, an initialization driver including a plurality of initialization stage circuits to generate an initialization scan signal, and an output controller including a plurality of control stage circuits, wherein each of the plurality of control stage circuits includes a first control transistor and a second control transistor, which are connected in series between a main power input terminal and an output terminal, and a third control transistor and a fourth control transistor, which are connected in series between the output terminal and a second power input terminal. The second control transistor and the third control transistor may be turned on or turned off in response to an enable signal and output a masking signal which controls an output of the compensation scan signal and the initialization scan signal.

A gate electrode of the first control transistor included in an i-th (i is a natural number of 1 or more) control stage circuit may be connected to a third node of an i-th emission stage circuit, and a gate electrode of the fourth control transistor in the i-th control stage circuit may be connected to a second node of the i-th emission stage circuit.

Each of the plurality of control stage circuits may further include a capacitor connected between the output terminal and a third power input terminal.

Each of the third control transistor and the fourth control transistor may include a body electrode, and the body electrode of each of the third control transistor and the fourth transistor may be connected to a third power input terminal.

A logic high level voltage may be input to the main input terminal, and a logic low level voltage may be input to the second power input terminal and the third power input terminal.

A voltage input to the second power input terminal may be higher than a voltage input to the third power input terminal.

Each of the first control transistor and the second control transistor may be a P-type transistor, and each of the third transistor and the fourth transistor may be an N-type transistor.

Each of the plurality of emission stages may output a high level emission control signal when the first node and the third node have a logic high level voltage, and the second node has a logic low level voltage.

Each of the plurality of compensation stage circuits and the plurality of initialization stage circuits may include a first output unit configured to output a carry signal in response to a voltage of each of a first control node and a second control node, a second output unit configured to output the compensation scan signal or the initialization scan signal in response to a voltage of each of the first control node and a third control node, and a masking unit connected between the second control node and the third control node. The masking unit may control an electrical connection between the second control node and the third control node in response to the masking signal.

The masking unit may include a first masking transistor connected between the second control node and the third control node, wherein the first masking transistor may include a gate electrode receiving the masking signal, and a second masking transistor connected between the main power input terminal and the third control node, wherein the second masking transistor may include a gate electrode receiving the masking signal. The first masking transistor may be a P-type transistor and the second masking transistor may be an N-type transistor.

According to an embodiment of the present disclosure, a display device includes a display unit including pixels connected to scan lines, emission control lines, and data lines, an emission driver including emission stage circuits to supply an emission control signal to the emission control lines, a compensation driver including compensation stage circuits to supply a compensation scan signal to compensation scan lines among the scan lines, an initialization driver including initialization stage circuits to supply an initialization scan signal to initialization scan lines among the scan lines, a timing controller configured to control the emission driver, the compensation driver, and the initialization driver, and an output controller including control stage circuits controlling an output of the compensation scan signal and the initialization scan signal in response to an internal voltage of the emission stage circuits and an enable signal supplied from the timing controller.

The display unit may be divided into a plurality of areas, and the timing controller may drive the plurality of areas at different driving frequencies by controlling the enable signal to have a first level or a second level.

Each of the emission stage circuits may include an emission output unit outputting an emission control signal in response to a voltage of each of a first node and a second node, and a first emission transistor connected between a third node electrically connected to the first node and an input terminal.

An i-th (i is a natural number of 1 or more) control stage circuit may output a masking signal which controls the output of the compensation scan signal of an i-th compensation stage circuit and the initialization scan signal of an i-th initialization stage circuit in response to a voltage of each of the second node and the third node of an i-th emission stage circuit and a voltage of the enable signal.

The i-th control stage circuit may include a first control transistor and a second control transistor, connected in series between a main power input terminal and an output terminal to which the masking signal is output, a third control transistor and a fourth control transistor, connected in series between the output terminal and a second power input terminal, and a capacitor connected between the output terminal and a third power input terminal. A gate electrode of the first control transistor may be connected to the third node of the i-th emission stage circuit, and a gate electrode of the fourth control transistor may be connected to the second node of the i-th emission stage circuit.

A gate electrode of each of the second control transistor and the third control transistor may be supplied with the enable signal.

Each of the third control transistor and the fourth control transistor may include a body electrode, and the body electrode of each of the third control transistor and the fourth control transistor may be connected to the third power input terminal. A voltage of a second power source supplied to the second power input terminal may be higher than a voltage of a third power source supplied to the third power input terminal.

Each of the first control transistor and the second transistor may be a P-type transistor, and each of the third control transistor and the fourth control transistor may be an N-type transistor.

Each of the compensation stage circuits and the initialization stage circuits may include a first output unit configured to output a carry signal in response to a voltage of each of a first control node and a second control node, a second output unit configured to output the compensation scan signal or the initialization scan signal in response to a voltage of each of the first control node and a third control node, and a masking unit connected between the second control node and the third control node. The masking unit may control an electrical connection between the second control node and the third control node in response to the masking signal. The masking unit may include a first masking transistor connected between the second control node and the third control node, wherein the first masking transistor may include a gate electrode receiving the masking signal, and a second masking transistor connected between the main power input terminal and the third control node, wherein the second masking transistor may include a gate electrode receiving with the masking signal. The first masking transistor may be a P-type transistor, and the second masking transistor may be an N-type transistor.

According to an embodiment of the present disclosure, an electronic device includes a display panel including pixels, wherein the display panel may have a plurality of areas, an emission driver including emission stage circuits to supply an emission control signal to the pixels, a controller configured to supply an enable signal, a gate driver including a compensation driver including compensation stage circuits to supply a compensation scan signal to compensation scan lines, and an initialization driver including initialization stage circuits to supply an initialization scan signal to initialization scan lines, and an output controller including control stage circuits controlling an output of the compensation scan signal and the initialization scan signal are to be output in response to an internal voltage of the emission stage circuits and an enable signal supplied to the timing controller.

The electronic device may be one of a mobile phone, a tablet, a mobile communication terminal, an electronic notebook, an e-book, a portable multimedia player, a navigation device, an ultra mobile personal computer, a television, a laptop, a monitor, a billboard, an Internet of Things device, a smart watch, a watch phone, glasses, a head mounted display a vehicle dashboard, a vehicle mirror display, or a vehicle entertainment display.

BRIEF DESCRIPTION OF THE DRAWINGS

Embodiments of the present disclosure will now be described more fully hereinafter with reference to the accompanying drawings. However, the present disclosure may be implemented in different forms and should not be construed as limited to the embodiments set forth herein. Rather, the embodiments may be variously expanded without departing from the sprit and scope of the present disclosure.

In the drawings, dimensions may be exaggerated for convenience or clarity of illustration. It will be understood that when an element is referred to as being "between" two elements, it can be the only element between the two elements, or one or more intervening elements may also be present. Like reference numerals refer to like elements throughout the present disclosure.

DETAILED DESCRIPTION

Figure 1:
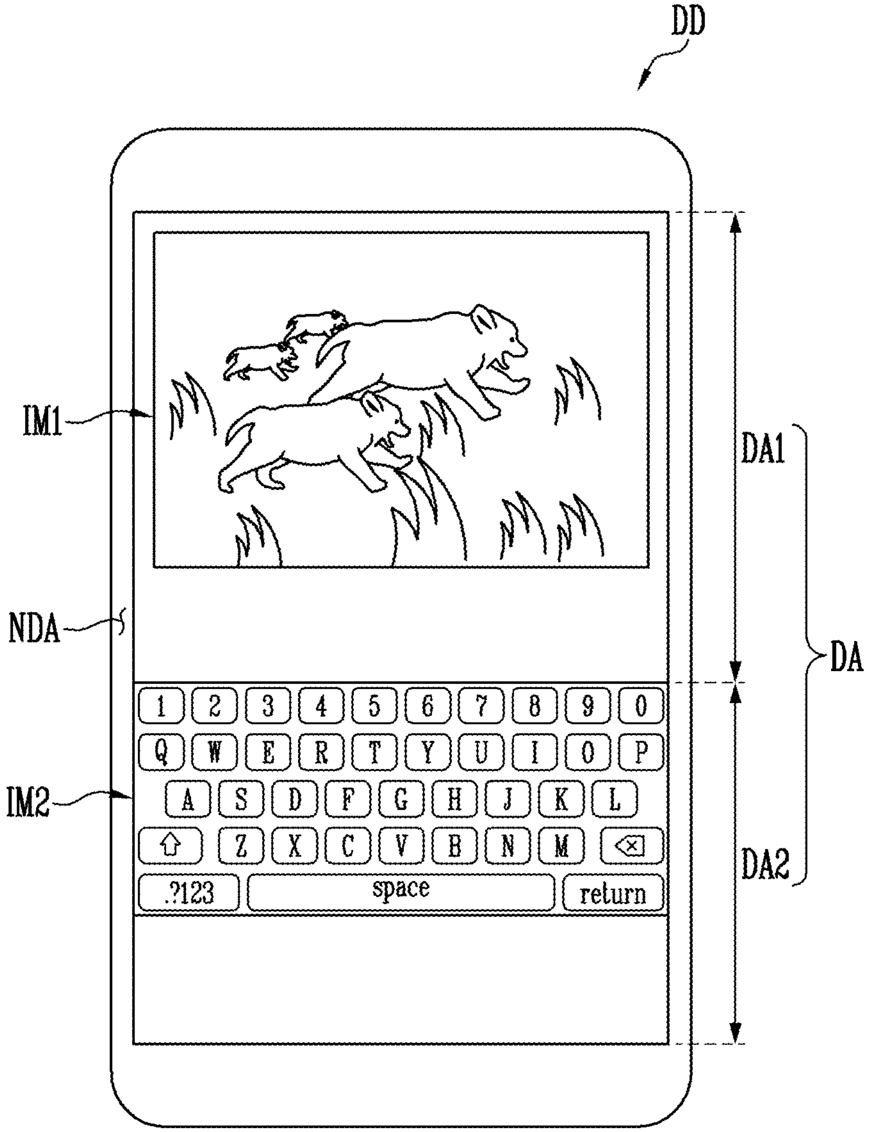
FIG. 1 is a diagram illustrating a display device in accordance with an embodiment of the present disclosure.

Hereinafter, embodiments of the present disclosure are described in detail with reference to the accompanying drawings in order for those skilled in the art to easily practice the present disclosure. The present disclosure may be implemented in various different forms and is not limited to the embodiments described in the present specification.

A part irrelevant to the description will be omitted to clearly describe the present disclosure, and the same or similar elements will be designated by the same reference numerals throughout the present disclosure. Therefore, the same reference numerals may be used in different drawings to identify the same or similar elements.

In addition, the size and thickness of each elements illustrated in the drawings are arbitrarily shown for better understanding and ease of description, but the present disclosure is not limited thereto. Thicknesses of several portions and regions are exaggerated for clear expressions.

In description, the expression "equal" may mean "substantially equal." That is, it may be considered identical to the extent that those skilled in the art would perceive it as the same. Other expressions may be understood as implicitly including the term "substantially".

Some embodiments are described in the accompanying drawings in relation to functional blocks, units, and/or modules. Those skilled in the art will understand that these blocks, units, and/or modules are physically implemented by logic circuits, individual components, microprocessors, hard wire circuits, memory elements, line connection, and other electronic circuits. This may be formed by using semiconductor-based manufacturing processes or other manufacturing steps. In the case of blocks, units, and/or modules implemented by microprocessors or other similar hardware, the blocks, units, and/or modules are programmed and controlled by using software, to perform various functions discussed in the present disclosure, and may be selectively driven by firmware and/or software. In addition, each block, each unit, and/or each module may be implemented by dedicated hardware or by a combination dedicated hardware to perform some functions of the block, the unit, and/or the module and a processor (e.g., one or more programmed microprocessors and associated circuitry) to perform other functions of the block, the unit, and/or the module. In an embodiment, the blocks, the units, and/or the modules may be physically separated into two or more individual blocks, two or more individual units, and/or two or more individual modules without departing from the scope of the present disclosure. Also, in an embodiment, the blocks, the units, and/or the modules may be physically separated into more complex blocks, more complex units, and/or more complex modules without departing from the scope of the present disclosure.

The term "connection" between two components may include either electrical connection or physical connection. For example, the term "connection" used to explain circuit diagrams may represent electrical connection, and the term "connection" used in association with sectional and plan views may represent physical connection.

It will be understood that, although the terms "first," "second," etc. may be used herein to describe various elements, these elements should not be limited by these terms. These terms are only used to distinguish one element from another element. Thus, a "first" element discussed below could also be termed a "second" element without departing from the scope of the present disclosure.

The present disclosure is not limited to embodiments disclosed below, and may be implemented in various forms. Each embodiment disclosed below may be implemented independently or in combination with at least another embodiment.

FIG. 1 is a diagram illustrating a display device in accordance with an embodiment of the present disclosure. FIG. 1 may illustrate a case where a display device DD is included in a portable terminal.

Referring to FIG. 1, the display device DD may include a display area DA and a non-display area NDA.

The display area DA may be an area in which a predetermined image is displayed, and include a first area DA1 and a second area DA2. The display area DA may include pixels PX shown in FIG. 2. In a specific application program, a first image IM1 may be displayed in the first area DA1, and a second image IM2 may be displayed in the second area DA2. For example, the first image IM1 may be a rapidly changing image (e.g., video), and the second image IM2 may be a slowly changing image (e.g., a still image).

In the display device DD, different driving frequencies may be applied corresponding to the display area DA. For example, the first area DA1 in which the first image IM1 is displayed may be driven at a first driving frequency, and the second area DA2 in which the second image IM2 is displayed may be driven at a second driving frequency lower than the first driving frequency. When the second area DA2 of the display device DD is driven at the second driving frequency, power consumption may be reduced.

In an embodiment, the first area DA1 and the second area DA2 are not fixed, but may be changed corresponding to a displayed image. In an example, the display device DD may include a plurality of areas, and driving frequencies in the plurality of areas may be different from each other, corresponding to a displayed image.

The non-display area NDA may be an area in which signal lines and drivers are disposed. For example, a scan driver 130 and/or an emission driver 150, shown in FIG. 2, may be disposed in the non-display area NDA.

Figure 2:
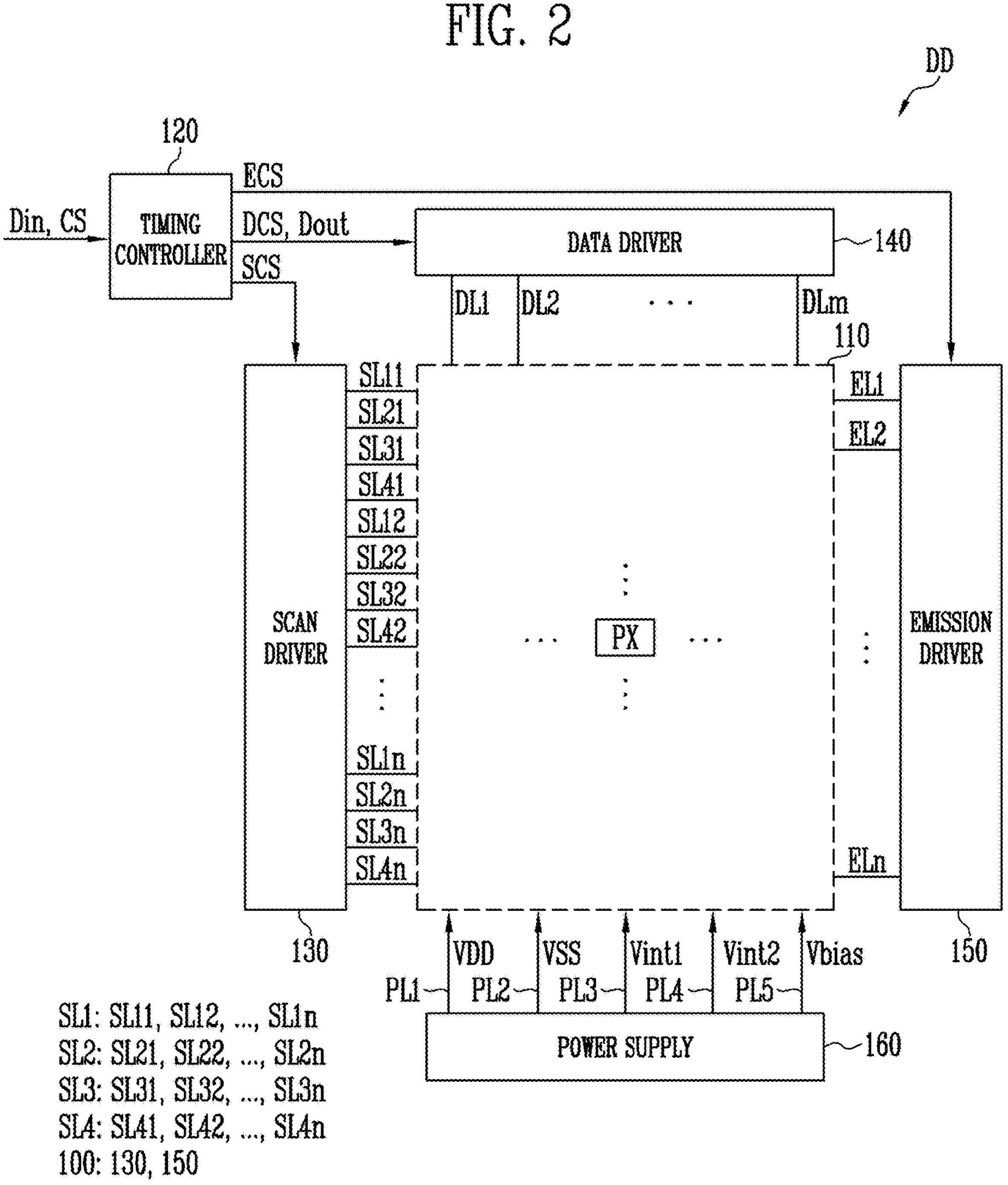
FIG. 2 is a diagram illustrating a display device in accordance with an embodiment of the present disclosure.
Figure 3:
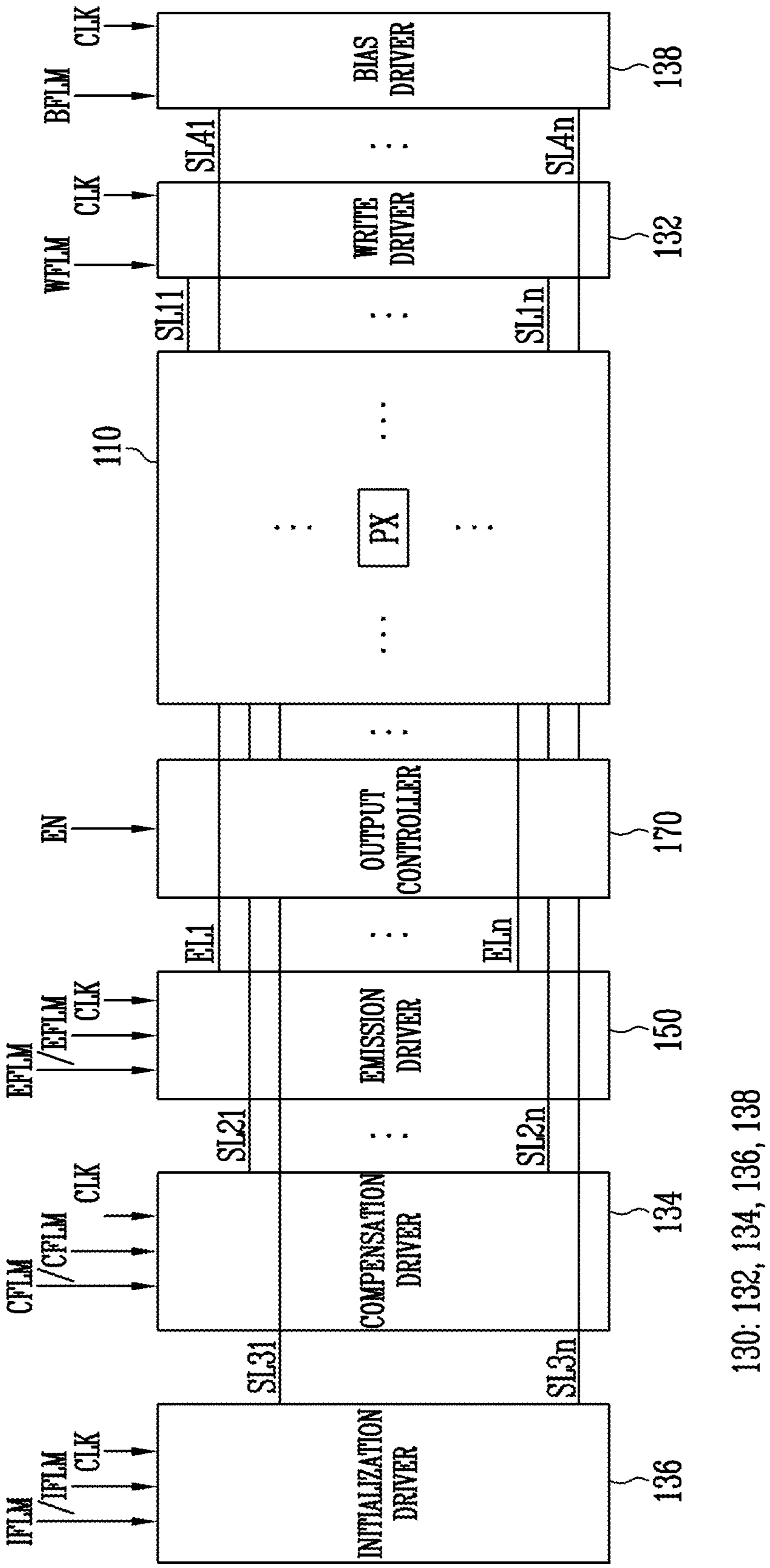
FIG. 3 is a diagram illustrating a driving circuit shown in FIG. 2 in accordance with an embodiment of the present disclosure.

FIG. 2 is a diagram illustrating a display device in accordance with an embodiment of the present disclosure. FIG. 3 is a diagram illustrating a driving circuit shown in FIG. 2 according to an embodiment.

Referring to FIG. 2, the display device DD in accordance with the embodiment of the present disclosure may include a display unit 110 (or display panel), a driving circuit 100, a timing controller 120, a data driver 140, and a power supply 160.

The display device DD may drive a plurality of areas of the display unit 110 in different driving frequencies (e.g., image refresh rates, or screen refresh rates), corresponding to a display image. A driving frequency may be a screen scan rate or a screen refresh frequency, and represent a frequency at which a display screen is refreshed per second.

The driving circuit 100 may control a number of times a scan signal is supplied to one horizontal line (e.g., pixels PX connected to the same scan line may be classified as one horizontal line (or pixel row)), corresponding to a driving frequency. For example, the driving circuit 100 may supply the scan signal k (k is a natural number of 2 or more) times per second to each of pixels PX included in a first area of the display unit 110, which is driven at a high frequency, and supply the scan signal o (o is a natural number smaller than k) times per second to each of pixels PX included in a second area of the display unit 110, which is driven at a low frequency.

The driving circuit 100 may include a scan driver 130 and an emission driver 150. The scan driver 130 may control a number of times the scan signal is supplied for each area of the display unit 110 under the control of the timing controller 120.

The display unit 110 may include pixels PX connected to first scan lines SL11, SL12, . . . , and SL1*n*, second scan lines SL21, SL22, . . . , and SL2*n*, third scan lines SL31, SL32, . . . , and SL3*n*, fourth scan lines SL41, SL42, . . . , and SL4*n*, data lines DL1, DL2, . . . , and DLm, emission control lines EL1, EL2, . . . , and ELn, and power lines PL1, PL2, PL3, PL4, and PL5 (n and m are natural numbers of 2 or more).

For example, a pixel PXij (see FIG. 4) located on an i-th horizontal line (or pixel row) and a j-th vertical line (or pixel column) may be connected to an i-th first scan line SL1*i*, an i-th second scan line SL2*i*, an i-th third scan line SL3*i*, an i-th fourth scan line SL4*i*, an i-th emission control line ELi, and a j-th data line DLj (i is a natural number of n or less and j is a natural number of m or less).

Pixels PX may be selected in a horizontal line unit when a first scan signal is supplied to the first scan lines SL11 to SL1*n*. The pixels PX selected by the first scan signal may receive a data signal from a data line (any one of DL1 to DLm) connected thereto. The pixel PX supplied with the data signal may generate light with a predetermined luminance, corresponding to a voltage of the data signal.

The scan driver 130 may supply a scan signal to the scan lines SL1, SL2, SL3, and SL4, and the emission driver 150 may supply an emission control signal to the emission control lines EL1 to ELn. In an embodiment, the driving circuit 100 may further include an output controller 170 as shown in FIG. 3.

Referring to FIG. 3, the driving circuit 100 may include the scan driver 130, the emission driver 150, and the output controller 170.

The scan driver 130 may receive a scan driving signal SCS from the timing controller 130. Start signals WFLM, CFLM, /CFLM, IFLM, /IFLM, and BFLM and clock signals CLK may be included in the scan driving signal SCS.

The scan driver 130 may include a write driver 132, a compensation driver 134, an initialization driver 136, and a bias driver 138. At least some of the drivers 132, 134, 136, and 138 may be integrated into a single circuit.

The write driver 132 may receive a write start signal WFLM, and generate the first scan signal (or write scan signal), in response to a clock signal CLK. The write driver 132 may sequentially supply the first scan signal to the first scan lines SL11 to SL1*n*.

The compensation driver 134 may receive a compensation start signal CFLM and a reverse compensation start signal /CFLM, and generate a second scan signal (or compensation scan signal), in response to a clock signal CLK. The compensation driver 134 may sequentially supply the second scan signal to the second scan lines SL21 to SL2*n*.

The initialization driver 136 may receive an initialization start signal IFLM and a reverse initialization start signal /IFLM, and generate a third scan signal (or initialization scan signal), in response to a clock signal CLK. The initialization driver 136 may sequentially supply the third scan signal to the third scan lines SL31 to SL3*n*.

The bias driver 138 may receive a bias start signal BFLM, and generate a fourth scan signal (or bias scan signal), in response to a clock signal CLK. The bias driver 138 may sequentially supply the fourth scan signal to the fourth scan lines SL41 to SL4*n*.

The first scan signal, the second scan signal, the third scan signal, and the fourth scan signal may have a first level (e.g., a low voltage) or a second level (e.g., a high voltage). For example, a scan signal having the first level (e.g., the first scan signal having the first level and the fourth scan signal having the first level) may be supplied to a P-type transistor included in the pixels PX to turn on the P-type transistor. For example, a scan signal having the second level (e.g., the second scan signal having the second level and the third scan signal having the second level) may be supplied to an N-type transistor included in the pixels PX to turn on the N-type transistor.

The clock signal CLK may include a plurality of clock signals, and the clock signals supplied to the drivers 132, 134, 136, and 138 may be equal to or different from one another.

The emission driver 150 may receive an emission driving signal ECS from the timing controller 130. Start signals EFLM and /EFLM and clock signals CLK may be included in the emission driving signal.

The emission driver 150 may receive an emission start signal EFLM and a reverse emission start signal /EFLM, and generate an emission control signal, in response to a clock signal CLK. The emission driver 150 may sequentially supply the emission control signal to the emission control lines EL1 to ELn.

The emission control signal may have a first level (e.g., a low voltage) or a second level (e.g., a high voltage). For example, the emission control signal having the second level may be supplied to the P-type transistor included in the pixels PX. The P-type transistor supplied with the emission control signal having the second level may be turned off.

The output controller 170 may be supplied with an enable signal EN from the timing controller 120. The enable signal EN may be included in the scan driving signal SCS or the emission driving signal ECS to be supplied to the output controller 170, or the enable signal EN may be supplied to the output controller 170 via a separate line.

The output controller 170 may control the output of the second scan signal and the third scan signal in a horizontal line unit in response to an internal voltage of an emission stage circuit included in the emission driver 150 and the enable signal EN. For example, the output controller 170 may control the output of an i-th second scan signal and an i-th third scan signal in response to an internal voltage of an i-th emission stage circuit outputting an i-th emission control signal and the enable signal EN.

That is, the output controller 170 may control the output of the second scan signal and the third scan signal to be supplied to each area of the display unit 110, and accordingly, a plurality of areas included in the display unit 110 may be driven at different driving frequencies. This will be described in detail later with reference to FIGS. 6 to 17.

The data driver 140 may receive output data Dout and a data driving signal DCS from the timing controller 120. The data driving signal DCS may include a sampling signal and/or timing signals. The data driver 140 may generate a data signal, based on the data driving signal DCS and the output data Dout. For example, the data driver 140 may generate an analog data signal, corresponding to a grayscale of the output data Dout. The data driver 140 may supply the data signal in one horizontal period unit.

The timing controller 120 may receive input data Din and a control signal CS from a host system through an interface. For example, the timing controller 120 may receive the input data Din and the control signal CS from at least one of a Graphics Processing Unit (GPU), a Central Processing Unit (CPU), or an Application Processor (AP), which are included in the host system. The control signal CS may include various signals including a clock signal.

The timing controller 120 may generate the scan driving signal SCS, the data driving signal DCS, and the emission driving signal ECS, based on the control signal CS. The scan driving signal SCS, the data driving signal DCS, and the emission driving signal ECS may be supplied to the scan driver 130, the data driver 140, and the emission driver 150, respectively. Also, the timing controller 120 may supply the enable signal EN to the output controller 170.

The timing controller 120 may rearrange the input data Din to match the specifications of the display device DD. Also, the timing controller 120 may generate the output data Dout by correcting the input data Din, and supply the output data Dout to the data driver 140. In an embodiment, the timing controller 120 may correct the input data Din, corresponding to an optical measurement result measured in a processing process.

The power supply 160 may generate various power sources to drive the display device DD. For example, the power supply 160 may generate a first driving power source VDD, a second driving power source VSS, a first initialization power source Vint1, a second initialization power source Vint2, and a bias power source Vbias.

The first driving power source VDD may be a power source which generates a driving current in each of the pixels PX. The second driving power source VSS may be a power source which connects to a second electrode (or cathode electrode) of a light emitting element LD included in each of the pixels PX and generates the driving current in association with the first driving power source VDD. The first driving power source VDD may have a voltage higher than a voltage of the second driving power source VSS during a period in which the pixels PX are in an emission state.

The first initialization power source Vint1 may be a power source for initializing a gate electrode of a driving transistor included in each of the pixels PX. The second initialization power source Vint2 may be a power source for initializing a first electrode (or anode electrode) of the light emitting element LD included in each of the pixels PX. The second initialization power source Vint2 may be a voltage which turns off the light emitting element LD. The bias power source Vbias may be a power source for applying an on-bias voltage to the driving transistor included in each of the pixels PX.

The first driving power source VDD generated by the power supply 160 may be supplied to a first power line PL1, the second driving power source VSS generated by the power supply 160 may be supplied to each pixels PX through a second power line PL2, the first initialization power source Vint1 generated by the power supply 150 may be supplied to each pixels PX through a third power line PL3, the second initialization power source Vint2 generated by the power supply 150 may be supplied to each pixels PX through a fourth power line PL4, and the bias power source Vbias generated by the power supply 150 may be supplied to each pixels through a fifth power line PL5. The first power line PL1, the second power line PL2, the third power line PL3, the fourth power line PL4, and the fifth power line PL5 may be commonly connected to the pixels PX, but the present disclosure is not limited thereto.

In an embodiment, the first power line PL1 may include a plurality of power lines, and the plurality of power lines may be connected to different pixels PX. In an embodiment, the second power line PL2 may include a plurality of power lines, and the plurality of power lines may be connected to different pixels PX. In an embodiment, the third power line PL3 may include a plurality of power lines, and the plurality of power lines may be connected to different pixels PX. In an embodiment, the fourth power line PL4 may include a plurality of power lines, and the plurality of power lines may be connected to different pixels PX. In an embodiment, the fifth power line PL5 may include a plurality of power lines, and the plurality of power lines may be connected to different pixels PX. That is, in an embodiment of the present disclosure, each of the pixels PX may be connected to any one of the plurality of power lines of the first power line PL1, any one of the plurality of power lines of the second power line PL2, any one of the plurality of power lines of the third power line PL3, any one of the plurality of power lines of the fourth power line PL4, and any one of the plurality of power lines of the fifth power line PL5.

In an embodiment of the present disclosure, the display device DD may include a flat display device, a curved display device in which a portion of the display unit 110 is curved, a flexible display device in which a portion of the display unit 110 is folded or bent, and a stretchable display device in which a portion of the display unit 110 is expanded or contracted.

In an embodiment of the present disclosure, the display device DD is a device which displays video or still images, and may include portable electronic devices such as a mobile phone, a smartphone, a tablet personal computer (PC), a smart watch, a watch phone, a portable multimedia player (PMP), a navigation system, or an ultra mobile computer (UMPC). In an embodiment of the present disclosure, the display device DD may include electronic devices such as a television, a notebook computer, a monitor, an advertisement board, or Internet of things (IoT).

Figure 4:
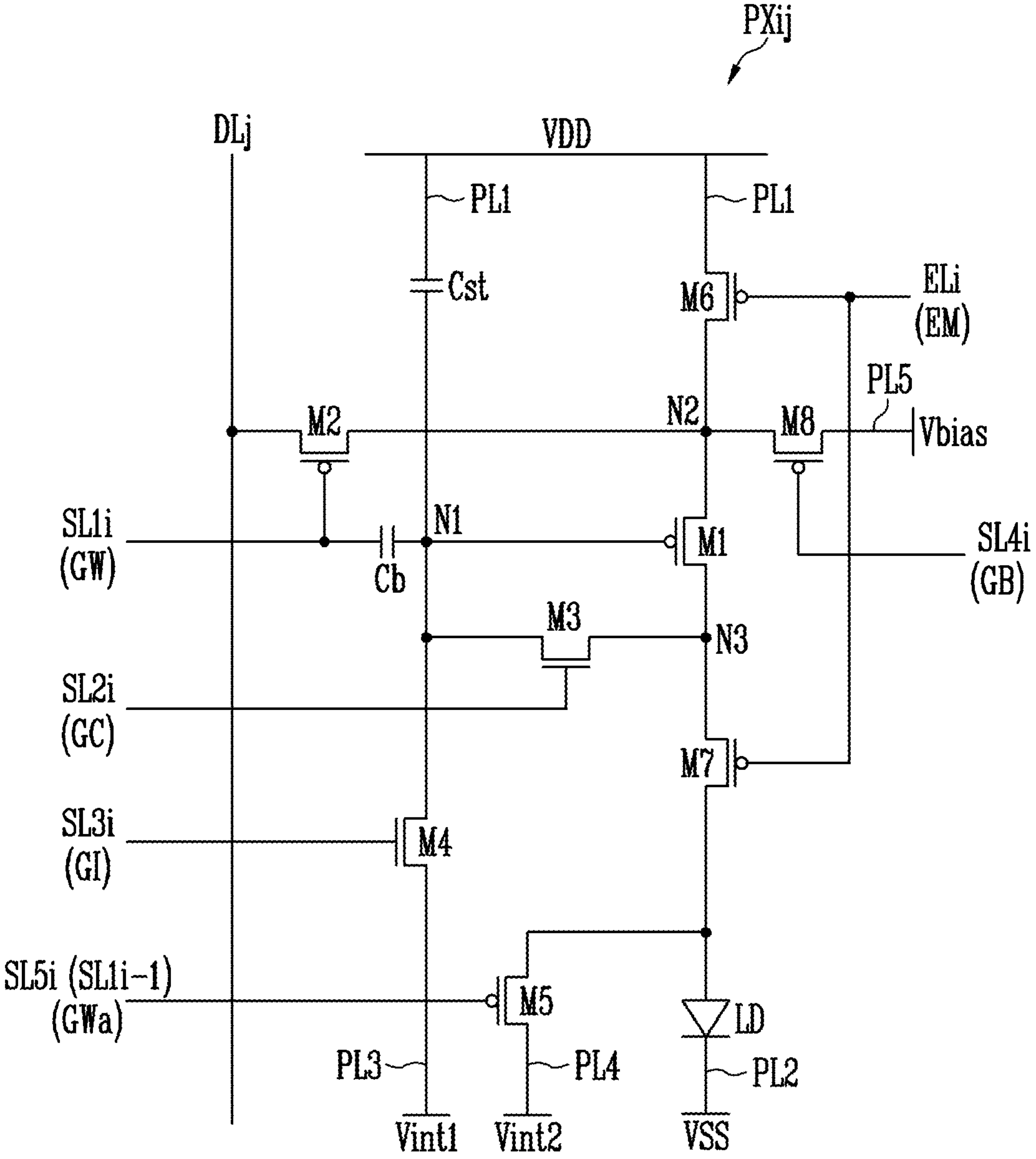
FIG. 4 is a diagram illustrating a pixel in accordance with an embodiment of the present disclosure.

FIG. 4 is a diagram illustrating a pixel in accordance with an embodiment of the present disclosure. FIG. 4 illustrates a pixel located on an i-th horizontal line and a j-th vertical.

Referring to FIG. 4, the pixel PXij in accordance with an embodiment of the present disclosure may be connected to corresponding signal lines SL1*i*, SL2*i*, SL3*i*, SL4*i*, SL5*i*, ELi, and DLj. For example, the pixel PXij may be connected to an i-th first scan line SL1*i*, an i-th second scan line SL2*i*, an i-th third scan line SL3*i*, an i-th fourth scan line SL4*i*, an i-th fifth scan line SL5*i*, an i-th emission control line ELi, and a j-th data line DLj. In an embodiment, the pixel PXij may be further connected to the first power line PL1, the second power line PL2, the third power line PL3, the fourth power line PL4, and the fifth power line PL5. The i-th fifth scan line SL5*i* may an (i−1)-th first scan line SL1*i*-1 connected to a pixel PX(i−1) j located on a previous horizontal line (i.e., an (i−1)-th horizontal line). In another example, the i-th fifth scan line SL5*i* may be connected to the i-th fourth scan line SL4*i*.

The pixel PXij in accordance with the embodiment of the present disclosure may include a light emitting element LD and a pixel circuit for controlling an amount of the driving current supplied to the light emitting element LD.

The light emitting element LD may be connected between the first power line PL1 and the second power line PL2. For example, a first electrode (or anode electrode) of the light emitting element LD may be electrically connected to the first power line PL1 via a seventh transistor M7, a third node N3, a first transistor M1, a second node N2, and a sixth transistor M6, and a second electrode (or cathode electrode) of the light emitting element LD may be electrically connected to the second power line PL2. The light emitting element LD may generate light having a predetermined luminance, corresponding to an amount of the driving current between the first power line PL1 to the second power line PL2 via the pixel circuit.

The light emitting element LD may be an organic light emitting diode. However, the present disclosure is not limited thereto. For example, the light emitting element LD may be an inorganic light emitting diode such as a micro LED (light emitting diode) or a quantum dot light emitting diode. For example, the light emitting element LD may be an element having a combination of an organic material and an inorganic material. FIG. 4 illustrates that the pixel PXij includes a single light emitting element LD. However, in an embodiment, the pixel PXij may include a plurality of light emitting elements LD, and the plurality of light emitting elements LD may be connected in series or in parallel to each other.

The pixel circuit may include a first transistor M1, a second transistor M2, a third transistor M3, a fourth transistor M4, a fifth transistor M5, the sixth transistor M6, a seventh transistor M7, an eighth transistor M8, a storage capacitor Cst, and a boosting capacitor Cb.

A first electrode of the first transistor M1 (or driving transistor) may be connected to the second node N2, and a second electrode of the first transistor M1 may be connected to the third node N3. In addition, a gate electrode of the first transistor M1 may be connected to a first node N1. The first transistor M1 may control an amount of the driving current supplied to the light emitting element LD in response to a voltage of the first node N1.

The second transistor M2 may be connected to the data line DLj and the second node N2. In addition, a gate electrode of the second transistor M2 may be electrically connected to the first scan line SL1*i*. The second transistor M2 may be turned on when a first level first scan signal GW is supplied to the first scan line SL1*i* and may electrically connect the data line DLj to the second node N2.

The third transistor M3 may be connected between the first node N1 and the third node N3. In addition, a gate electrode of the third transistor M3 may be electrically connected to the second scan line SL2*i*. The third transistor M3 may be turned on when a second level second scan signal GC is supplied to the second scan line SL2*i* and electrically connect the first node N1 and the third node N3. That is, when the third transistor M3 is turned on, the first transistor M1 may be diode-connected.

A first electrode of the fourth transistor M4 may be connected to the first node N1, and a second electrode of the fourth transistor M4 may be electrically connected to the third power line PL3. In addition, a gate electrode of the fourth transistor M4 may be electrically connected to the third scan line SL3*i*. The fourth transistor M4 may be turned on when a second level third scan signal GI is supplied to the third scan line SL3*i* and supply a voltage of the first initialization power source Vint1 to the first node N1.

A first electrode of the fifth transistor M5 may be connected to the first electrode of the light emitting element LD, and a second electrode of the fifth transistor M5 may be electrically connected to the fourth power line PL4. In addition, a gate electrode of the fifth transistor M5 may be electrically connected to the fifth scan line SL5*i*. The fifth transistor M5 may be turned on when a first level fifth scan signal GWa is supplied to the fifth scan line SL5*i* and supply a voltage of the second initialization power source Vint2 to the first electrode of the light emitting element LD.

When the voltage of the second initialization power source Vint2 is supplied to the first electrode of the light emitting element LD, a parasitic capacitor (not shown) of the light emitting element LD may be discharged. As a residual voltage charged in the parasitic capacitor of the light emitting element LD is discharged (or removed), the unintended minute emission of the light emitting element LD can be prevented. Thus, the black representation capability of the pixel PXij can be improved.

A first electrode of the sixth transistor M6 may be electrically connected to the first power line PL1, and a second electrode of the sixth transistor M6 may be connected to the second node N2. In addition, a gate electrode of the sixth transistor M6 may be electrically connected to the emission control line ELi. The sixth transistor M6 may be turned off when a second level emission control signal EM is supplied to the emission control line ELi, and be turned on when a first level emission control signal EM is supplied to the emission control line ELi.

The seventh transistor M7 may be connected between the third node N3 and the first electrode of the light emitting element LD. In addition, a gate electrode of the seventh transistor M7 may be electrically connected to the emission control line ELi. The seventh transistor M7 may be turned off when the second level emission control signal EM is supplied to the emission control line ELi, and be turned on when the first level emission control signal EM is supplied to the emission control line ELi.

A first electrode of the eighth transistor M8 (or bias transistor) may be electrically connected to the fifth power line PL5, and a second electrode of the eighth transistor M8 may be connected to the second node N2. In addition, a gate electrode of the eighth transistor M8 may be electrically connected to the fourth scan line SL4*i*. The eighth transistor M8 may be turned on when a first level fourth scan signal GB is supplied to the fourth scan line SL4*i* and electrically connect the fifth power line PL5 to the second node N2.

The storage capacitor Cst may be connected between the first power line PL1 and the first node N1. The storage capacitor Cst may store a voltage applied to the first node N1.

The boosting capacitor Cb may be connected between the first scan line SL1*i* and the first node N1. The boosting capacitor Cb may control the voltage of the first node N1, corresponding to a voltage of the first scan line SL1*i*.

In an embodiment, the first transistor M1, the second transistor M2, the fifth transistor M5, the sixth transistor M6, the seventh transistor M7, and the eighth transistor M8 may be implemented with a poly-silicon semiconductor transistor. For example, the first transistor M1, the second transistor M2, the fifth transistor M5, the sixth transistor M6, the seventh transistor M7, and the eighth transistor M8 may include a poly-silicon semiconductor layer which forms an active layer (channel) through a low temperature poly-silicon (LTPS) process. In addition, the first transistor M1, the second transistor M2, the fifth transistor M5, the sixth transistor M6, the seventh transistor M7, and the eighth transistor M8 may be implemented with a P-type transistor (e.g., a PMOS transistor). Accordingly, a gate-on voltage at which the first transistor M1, the second transistor M2, the fifth transistor M5, the sixth transistor M6, the seventh transistor M7, and the eighth transistor M8 are turned on may have a logic low level, i.e., the first level. Since the poly-silicon semiconductor transistor has an advantage of high response speed, the poly-silicon semiconductor transistor may be applied to a switching element which requires fast switching.

In an embodiment, the third transistor M3 and the fourth transistor M4 may be formed with an oxide semiconductor transistor. For example, the third transistor M3 and the fourth transistor M4 may be implemented with an N-type oxide semiconductor transistor (e.g., an NMOS transistor), and include an oxide semiconductor layer as an active layer. Accordingly, a gate-on voltage at which the third transistor M3 and the fourth transistor M4 are turned on may have a logic high level, i.e., the second level.

The oxide semiconductor transistor can be formed through a low temperature process, and may have a lower charge mobility compared to the poly-silicon semiconductor transistor. That is, the oxide semiconductor transistor has an excellent off-current characteristic. Thus, when the third transistor M3 and the fourth transistor M4 are implemented with the oxide semiconductor transistor, leakage current in association with low frequency driving can be minimized, thereby improving display quality.

Figure 5:
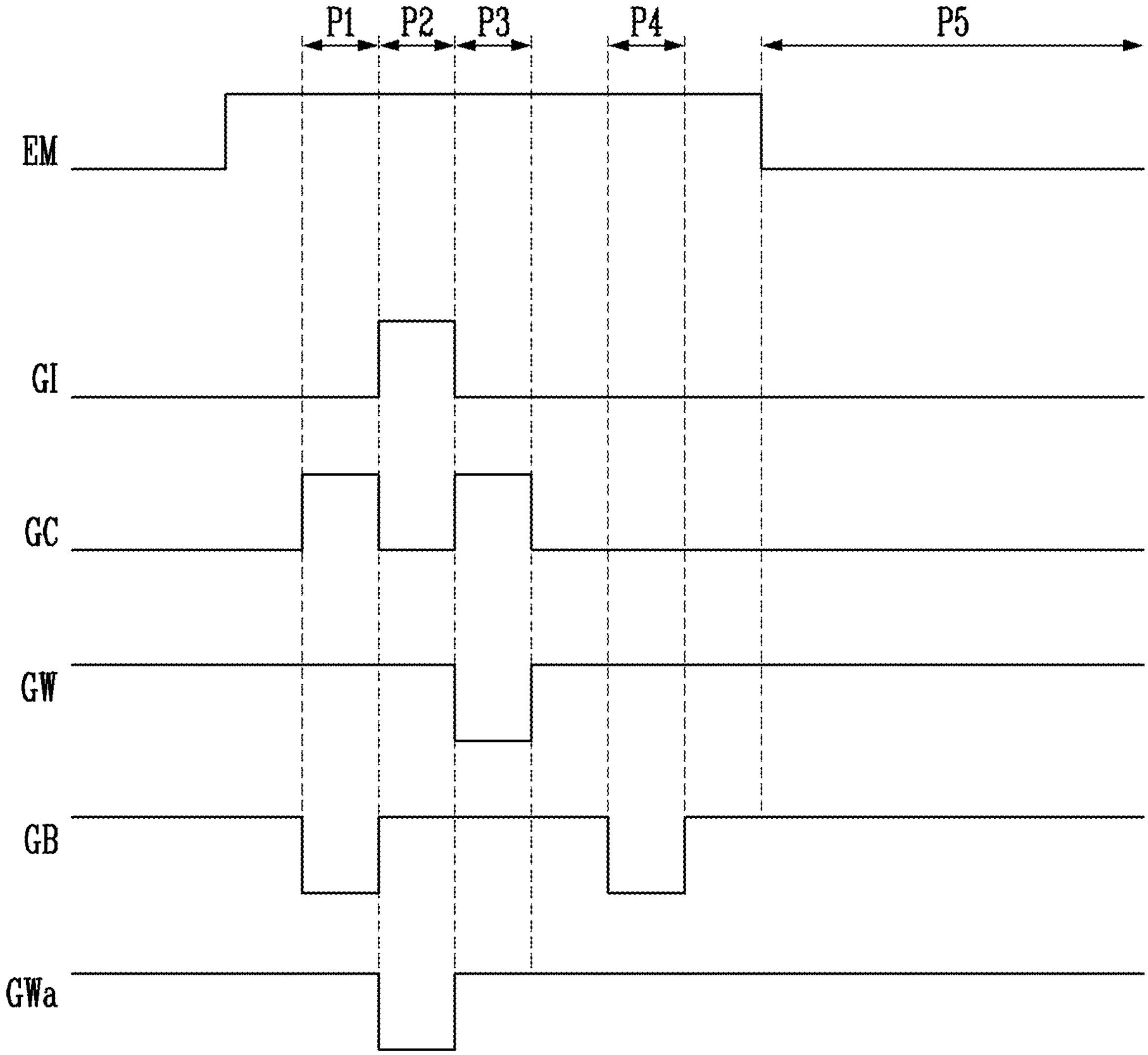
FIG. 5 is a waveform diagram illustrating a method of driving the pixel shown in FIG. 4 in accordance with an embodiment of the present disclosure.

FIG. 5 is a waveform diagram illustrating a method of driving the pixel shown in FIG. 4 in accordance with an embodiment of the present disclosure.

Referring to FIGS. 4 and 5, the driving scheme of the pixel PXij according to an embodiment may include a first period P1, a second period P2, a third period P3, a fourth period P4, and a fifth period P5. The first to fourth periods P1 to P4 may correspond to a non-emission period, and the fifth period P5 may correspond to an emission period.

During the first to fourth period P1 to P4, the second level emission control signal EM may be supplied to the emission control line ELi. When the second level emission control signal EM is supplied to the emission control line ELi, the sixth transistor M6 and the seventh transistor M7 may be turned off. When the sixth transistor M6 and the seventh transistor M7 are turned off, an electrical connection between the first power line PL1 and the light emitting element LD may be interrupted, and accordingly, the light emitting element LD may be set to be in a non-emission state.

During the first period P1, a second level second scan signal GC may be supplied to the second scan line SL2*i*, and a first level fourth scan signal GB may be supplied to the fourth scan line SL4*i*. When the second level second scan signal GC is supplied to the second scan line SL2*i*, the third transistor M3 may be turned on. When the third transistor M3 is turned on, the first node N1 and the third node N3 may be electrically connected to each other, and accordingly, the first transistor M1 may be diode-connected.

When the first level fourth scan signal GB is supplied to the fourth scan line SL4*i*, the eighth transistor M8 may be turned on. When the eighth transistor M8 is turned on, a voltage of the bias power source Vbias may be supplied to the second node N2, and the first transistor M1 may be set to be in an on-bias state during the first period P1.

During the second period P2, a second level third scan signal GI may be supplied to the third scan line SL3*i*. When the second level third scan signal GI is supplied to the third scan line SL3*i*, the fourth transistor M4 may be turned on. When the fourth transistor M4 is turned on, the voltage of the first initialization power source Vint1 of the third power line PL3 may be supplied to the first node N1.

During the second period P2, a first level fifth scan signal GWa may be supplied to the fifth scan line SL5. When the first level fifth scan signal GWa is supplied to the fifth scan line SL5, the fifth transistor M5 may be turned on. When the fifth transistor M5 is turned on, the voltage of the second initialization power source Vint2 may be supplied to the first electrode of the light emitting element LD. When the first electrode of the light emitting element LD is initialized by the voltage of the second initialization power source Vint2, the black representation capability can be improved.

During the third period P3, a second level second scan signal GC may be supplied to the second scan line SL2*i*, and accordingly, the third transistor M3 may be turned on. During the third period P3, the first level first scan signal GW may be supplied to the first scan line SL1*i*, and accordingly, the second transistor M2 may be turned on. When the second transistor M2 is turned on, a data signal from the data line DLj may be supplied to the second node N2. Since the diode-connection of the first transistor M1 is maintained by the turned-on third transistor M3, the first node N1 may have a voltage which compensates for a threshold voltage of the first transistor M1 with respect to the data signal supplied to the second node N2.

During the fourth period P4, a first level fourth scan signal GB may be supplied to the fourth scan line SL4*i*. When the first level fourth scan signal GB is supplied to the fourth scan line SL4*i*, the eighth transistor M8 may be turned on. When the eighth transistor M8 is turned on, the voltage of the bias power source Vbias may be supplied to the second node N2. When the voltage of the bias power voltage Vbias is supplied to the second node N2, the first transistor M1 may be set to be in the on-bias state.

In the fifth period P5, a first level emission control signal EM may be supplied to the emission control line ELi such that the sixth transistor M6 and the seventh transistor M7 are turned on. When the sixth transistor M6 and the seventh transistor M7 are turned on, a current flow path may be formed from the first power line PL1 to the second power line PL2 via the sixth transistor M6, the first transistor M1, the sixth transistor M7, and the light emitting element LD. A driving current corresponding to the voltage of the first node N1 may flow through the light emitting element LD in response to an operation of the first transistor M1, and the light emitting element LD may emit light with a luminance corresponding to the driving current.

Figure 6:
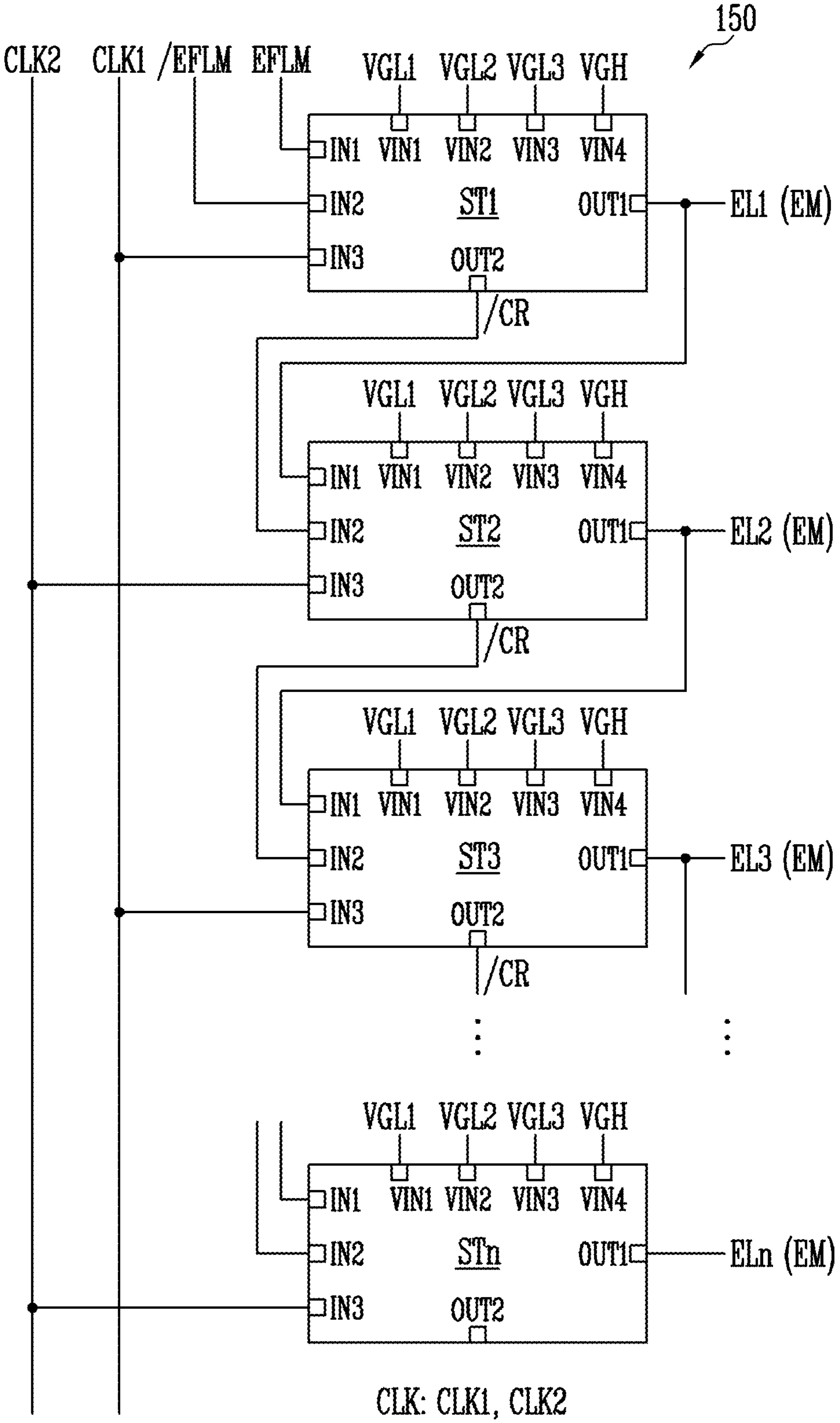
FIG. 6 is a diagram illustrating a stage circuit of an emission driver in accordance with an embodiment of the present disclosure.
Figure 7:
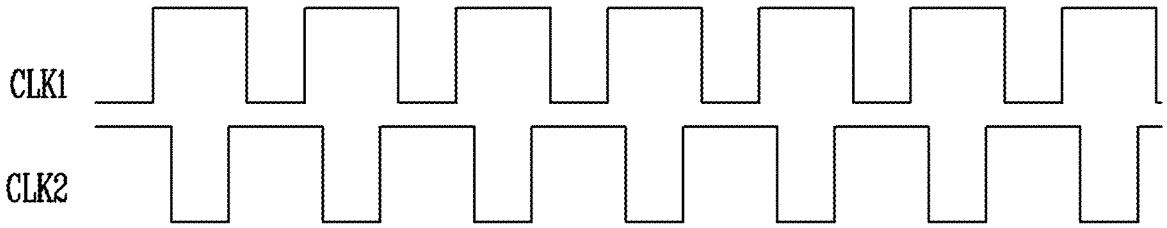
FIG. 7 is a waveform diagram illustrating clock signals shown in FIG. 6 in accordance with an embodiment of the present disclosure.

FIG. 6 is a diagram illustrating a stage circuit of the emission driver in accordance with an embodiment of the present disclosure. FIG. 7 is a waveform diagram illustrating clock signals shown in FIG. 6 according to an embodiment.

Referring to FIG. 6, the emission driver 150 in accordance with an embodiment of the present disclosure may include stage circuits (or emission stage circuits) ST1, ST2, ST3, . . . , and STn. Each of the stage circuits ST1 to STn may be electrically connected to any one of the emission control lines EL1, EL2, EL3, . . . , and ELn.

For example, a first stage circuit ST1 may be electrically connected to a first emission control line EL1, and supply an emission control signal EM to the first emission control line EL1. A second stage circuit ST2 may be electrically connected to a second emission control line EL2, and supply an emission control signal EM to the second emission control line EL2. A third stage circuit ST3 may be electrically connected to a third emission control line EL3, and supply an emission control signal EM to the third emission control line EL3. An n-th stage circuit STn may be electrically connected to an n-th emission control line ELn, and supply an emission control signal EM to the nth emission control line ELn.

Each of the stage circuits ST1 to STn may include a first input terminal IN1, a second input terminal IN2, a third input terminal IN3, a first power input terminal VIN1, a second power input terminal VIN2, a third power input terminal VIN3, a fourth power input terminal VIN4 (or main power input terminal), a first output terminal OUT1, and a second output terminal OUT2.

An emission start signal EFLM or an emission control signal EM of a previous stage circuit may be input to the first input terminal IN1. For example, the emission start signal EFLM may be input to a first input terminal IN1 of the first stage circuit ST1. For example, the emission control signal EM of a previous stage circuit may be input to a first input terminal IN1 of each of the second to n-th stage circuits ST2 to STn. An emission control signal EM of a previous stage circuit may be supplied as a carry signal to a next stage circuit.

A reverse emission start signal /EFLM or a reverse carry signal /CR of a previous stage circuit may be input to the second input terminal IN2. For example, the reverse emission start signal /EFLM may be input to a second input terminal IN2 of the first stage circuit ST1. For example, a reverse carry signal /CR of a previous stage circuit may be input to a second input terminal of each of the second to n-th stage circuits ST2 to STn.

A clock signal CLK may be input to the third input terminal IN3. The clock signal CLK may include a first clock signal CLK1 and a second clock signal CLK2. The first clock signal CLK1 may be input to a third input terminal IN3 of each of odd-numbered (or even-numbered) stage circuits ST1, ST3, . . . , and the second clock signal CLK2 may be input to a third input terminal IN3 of each of even-numbered (or odd-numbered) stage circuits ST2, . . . , and STn.

The first clock signal CLK1 and the second clock signal CLK2 may be signals which have the same cycle and have different phases as shown in FIG. 7. For example, the first clock signal CLK1 and the second clock signal CLK2 may have phases different from each other by 180 degrees.

A first power source VGL1 may be input to the first power input terminal VIN1, a second power source VGL2 may be input to the second power input terminal VIN2, a third power source VGL3 may be input to the third power input terminal VIN3, and a fourth power source VGH (or main power source) may be input to the fourth power input terminal VIN4 (or main power input terminal).

The first power source VGL1, the second power source VGL2, and the third power source VGL3 may have a logic low voltage. The first power source VGL1 may have a voltage higher than a voltage of the second power source VGL2, and the second power source VGL2 may have a voltage higher than a voltage of the third power source VGL3. The fourth power source VGH may have a logic high voltage. The fourth power source VGH may have a voltage higher than the voltage of the first power source VGL1.

An emission control signal EM may be output to the first output terminal OUT1. A reverse carry signal /CR may be output to the second output terminal OUT2.

Figure 8:
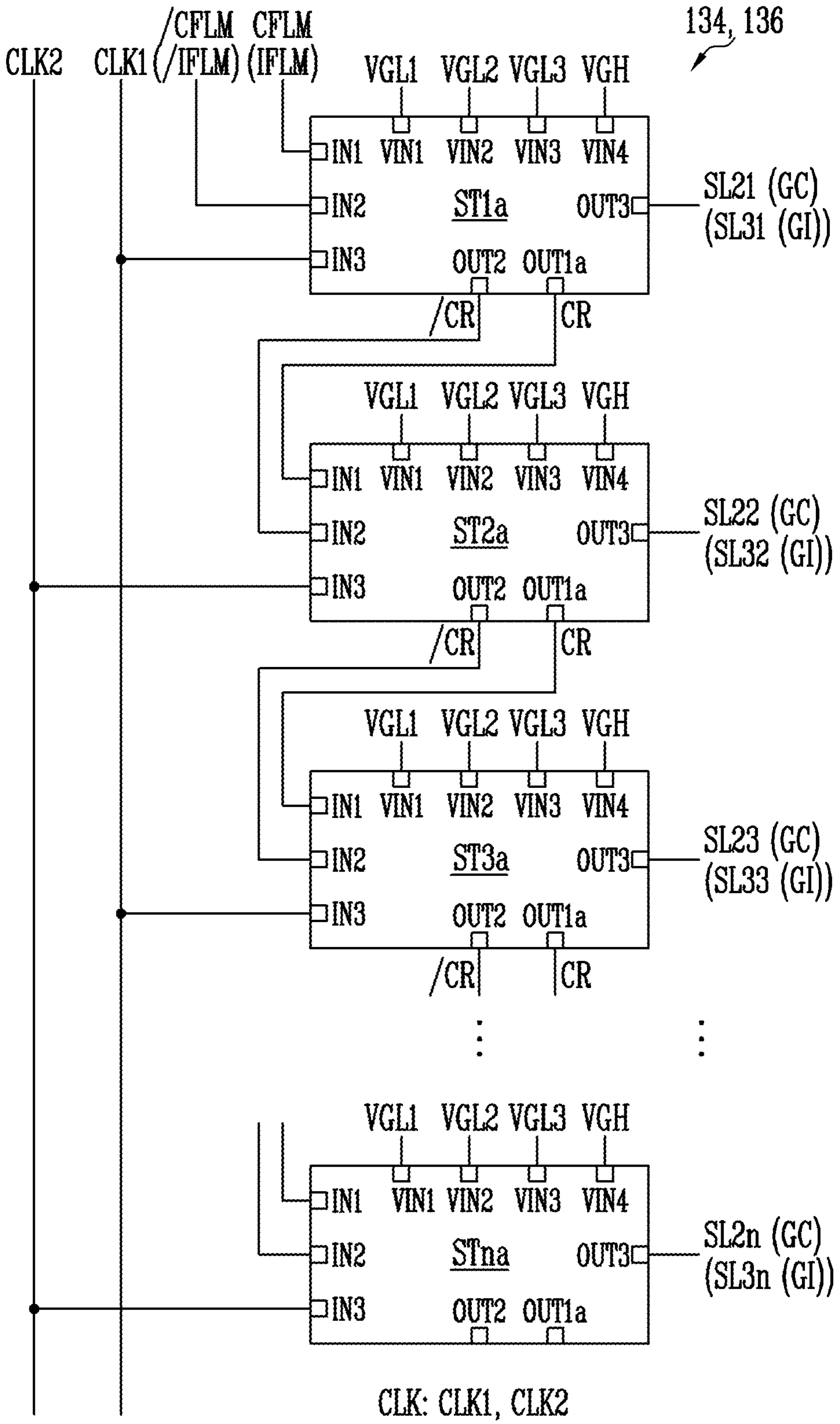
FIG. 8 is a diagram illustrating a stage circuit of a compensation driver and an initialization driver in accordance with an embodiment of the present disclosure.

FIG. 8 is a diagram illustrating a stage circuit of the compensation driver and the initialization driver in accordance with an embodiment of the present disclosure. For example, a stage circuit included in the compensation driver 134 may be referred to as a compensation stage circuit, and a stage circuit included in the initialization driver 136 may be referred to as an initialization stage circuit. The compensation stage circuit and the initialization stage circuit may substantially have the same structure.

Stage circuits ST1*a*, ST2*a*, ST3*a*, . . . , and STna of the compensation driver 134 and the initialization driver 136 may include a configuration similar or identical to the configuration of the stage circuits ST1 to STn of the emission driver 150. In FIG. 8, components similar or identical to the components of the stage circuits ST1 to STn shown in FIG. 6 are designated by the same reference numerals, and will be briefly described.

Referring to FIG. 8, each of the stage circuits ST1*a* to STn of the compensation driver 134 and the initialization driver 136 according to an embodiment of the present disclosure may be electrically connected to any one of the second scan lines SL21, SL22, SL23, . . . , and SL2*n* (or any one of the third scan lines SL31, SL32, SL33, . . . , and SL3*n*.

Each of the stage circuits ST1*a* to STna may include a first input terminal IN1, a second input terminal IN2, a third input terminal IN3, a first power input terminal VIN1, a second power input terminal VIN2, a third power input terminal VIN3, a fourth power input terminal VIN4, a first output terminal OUT1*a*, a second output terminal OUT2, and a third output terminal OUT3.

A compensation start signal CFLM (or an initialization start signal IFLM) or a carry signal of a previous stage circuit may be input to the first input terminal IN1. For example, the compensation start signal CFLM (or the initialization start signal IFLM) may be input to a first input terminal IN1 of a first stage circuit ST1*a*. For example, a carry signal CR of a previous stage circuit may be input to a first input terminal IN1 of each of second to n-th stage circuits ST2*a* to STna.

A reverse compensation start signal /CFLM (or a reverse initialization start signal /IFLM) or a reverse carry signal /CR of a previous stage circuit may be input to the second input terminal IN2. For example, the reverse compensation start signal /CFLM (or the reverse initialization start signal /IFLM) may be input to a second input terminal IN2 of the first stage circuit ST1*a*. For example, a reverse carry signal /CR of each of the second to n-th stage circuits ST2*a* to STna.

A carry signal CR may be output to the first output terminal OUT1*a*. A reverse carry signal /CR may be output to the second output terminal OUT2. A second scan signal GC (or a third scan signal GI) may be output to the third output terminal OUT3.

Figure 9:
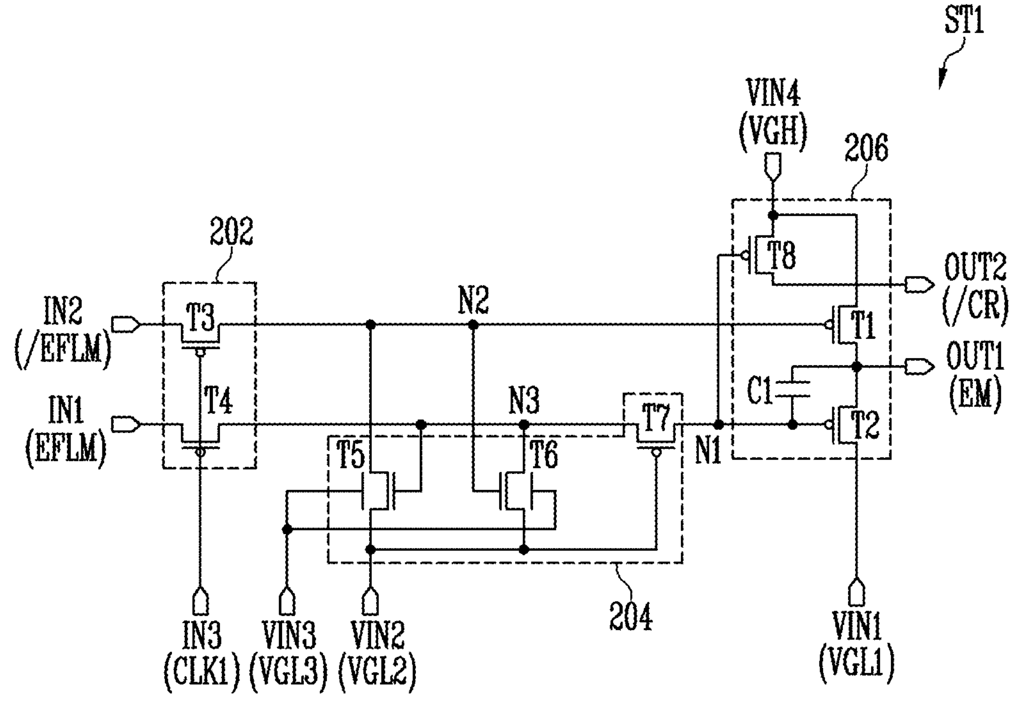
FIG. 9 is a circuit diagram illustrating the stage circuit of the emission driver shown in FIG. 6 in accordance with an embodiment of the present disclosure.

FIG. 9 is a circuit diagram illustrating the stage circuit shown in FIG. 6 in accordance with an embodiment of the present disclosure. For convenience of description, a first stage circuit ST1 is illustrated in FIG. 9.

Referring to FIG. 9, the stage circuit ST1 according to an embodiment of the present disclosure may include an input unit 202, the controller 204, and an output unit 206 (or emission output unit).

The output unit 206 may be connected to a first power input terminal VIN1 and a fourth power input terminal VIN4, and control a voltage of each of a first output terminal OUT1 and a second output terminal OUT2 in response to a voltage of each of a first node N1 and a second node N2. The output unit 206 may include a first transistor T1, a second transistor T2, an eighth transistor T8, and a first capacitor C1.

The first transistor T1 may be connected between the fourth input terminal VIN4 and the first output terminal OUT1. In addition, a gate electrode of the first transistor T1 may be connected to the second node N2. The first transistor T1 may control an electrical connection between the fourth power input terminal VIN4 and the first output terminal OUT1 by being turned on or turned off in response to a voltage of the second node N2. When the fourth power input terminal VIN4 and the first output terminal OUT1 are electrically connected to each other, a voltage of a fourth power source VGH may be supplied to the first output terminal OUT1. The voltage of the fourth power source VGH, which is supplied to the first output terminal OUT1, may be supplied as a second level emission control signal EM to an emission control line.

The second transistor T2 may be connected between the first power input terminal VIN1 and the first output terminal OUT1. In addition, a gate electrode of the second transistor T2 may be connected to the first node N1. The second transistor T2 may control an electrical connection between the first power input terminal VIN1 and the first output terminal OUT1 by being turned on or turned off in response to a voltage of the first node N1. When the first power input terminal VIN1 and the first output terminal OUT1 are electrically connected to each other, a voltage of a first power source VGL1 may be supplied to the first output terminal OUT1. The voltage of the first power source VGL1, which is supplied to the first output terminal OUT1, may be supplied as a first level emission control signal EM to the emission control line.

The eight transistor T8 may be connected between the fourth power input terminal VIN4 and the second output terminal OUT2. In addition, a gate electrode of the eighth transistor T8 may be connected to the first node N1. The eighth transistor T8 may control an electrical connection between the fourth power input terminal VIN4 and the second output terminal OUT2 by being turned on or turned off in response to the voltage of the first node N1.

The first capacitor C1 may be connected between the first output terminal OUT1 and the first node N1. The first capacitor C1 may control the voltage of the first node N1, corresponding to a voltage of the first output terminal OUT1. For example, the first capacitor C1 may be driven as a coupling capacitor.

The input unit 202 may be connected to a first input terminal IN1 and a second input terminal IN2, and control a voltage of each of the second node N2 and a third node N3 in response to a first clock signal CLK1 input to a third input terminal IN3. The third node N3 may be a node electrically connected to the first node N1.

The input unit 202 may include a third transistor T3 and a fourth transistor T4 (or first emission transistor). The third transistor T3 may be connected between the second input terminal IN2 and the second node N2, and a gate electrode of the third transistor T3 may be connected to the third input terminal IN3. The third transistor T3 may control an electrical connection between the second input terminal IN2 and the second node N2 by being turned on or turned off in response to the first clock signal CLK1 input to the third input terminal IN3.

The fourth transistor T4 may be connected between the first input terminal IN1 and the third node N3, and a gate electrode of the fourth transistor T4 may be connected to the third input terminal IN3. The fourth transistor T4 may control an electrical connection between the first input terminal IN1 and the third node N3 by being turned on or turned off in response to the first clock signal CLK1 input to the third input terminal IN3.

The controller 204 may be connected between a second power input terminal VIN2 and a third power input terminal VIN3, and control the voltage of each of the second node N2 and the third node N3. The controller 204 may include a fifth transistor T5, a sixth transistor T6, and a seventh transistor T7.

The fifth transistor T5 may be connected between the second node N2 and the second power input terminal VIN2, and a gate electrode of the fifth transistor T5 may be connected to the third node N3. In addition, a body electrode of the fifth transistor T5 may be connected to the third power input terminal VIN3. The fifth transistor T5 may control an electrical connection between the second node N2 and the second power input terminal VIN2 by being turned on or turned off in response to a voltage of the third node N3.

The sixth transistor T6 may be connected between the third node N3 and the second power input terminal VIN2, and a gate electrode of the sixth transistor T6 may be connected to the second node N2. In addition, a body electrode of the sixth transistor T6 may be connected to the third power input terminal VIN3. The sixth transistor T6 may control an electrical connection between the third node N3 and the second power input terminal VIN2 by being turned on or turned off in response to the voltage of the second node N2.

Each of the fifth transistor T5 and the sixth transistor T6 may include a body electrode, and a third power source VGL3 may be input to the body electrode. The third power source VGL3 input to the body electrode may have a lower voltage than a voltage of a second power source VGL2 input to a source electrode (or drain electrode) When a low voltage is input to the body electrode, a threshold voltage of each of the fifth transistor T5 and the sixth transistor T6 may be shifted toward a positive side, so that the stability of driving can be ensured.

The seventh transistor T7 may be connected between the first node N1 and the third node N3, and a gate electrode of the seventh transistor T7 may be connected to the second power input terminal VIN2. The seventh transistor T7 may electrically connect the first node N1 and the third node N3 to each other when the seventh transistor T7 is maintained in a turn-on state.

In an embodiment, the first to fourth transistors T1 to T4, the seventh transistor T7, and the eighth transistor T8 may be formed with a P-type transistor such that a fast switching operation is possible, and the fifth transistor T5 and the sixth transistor T6 may be formed with an N-type transistor such that a leakage current can be minimized.

Figure 10:
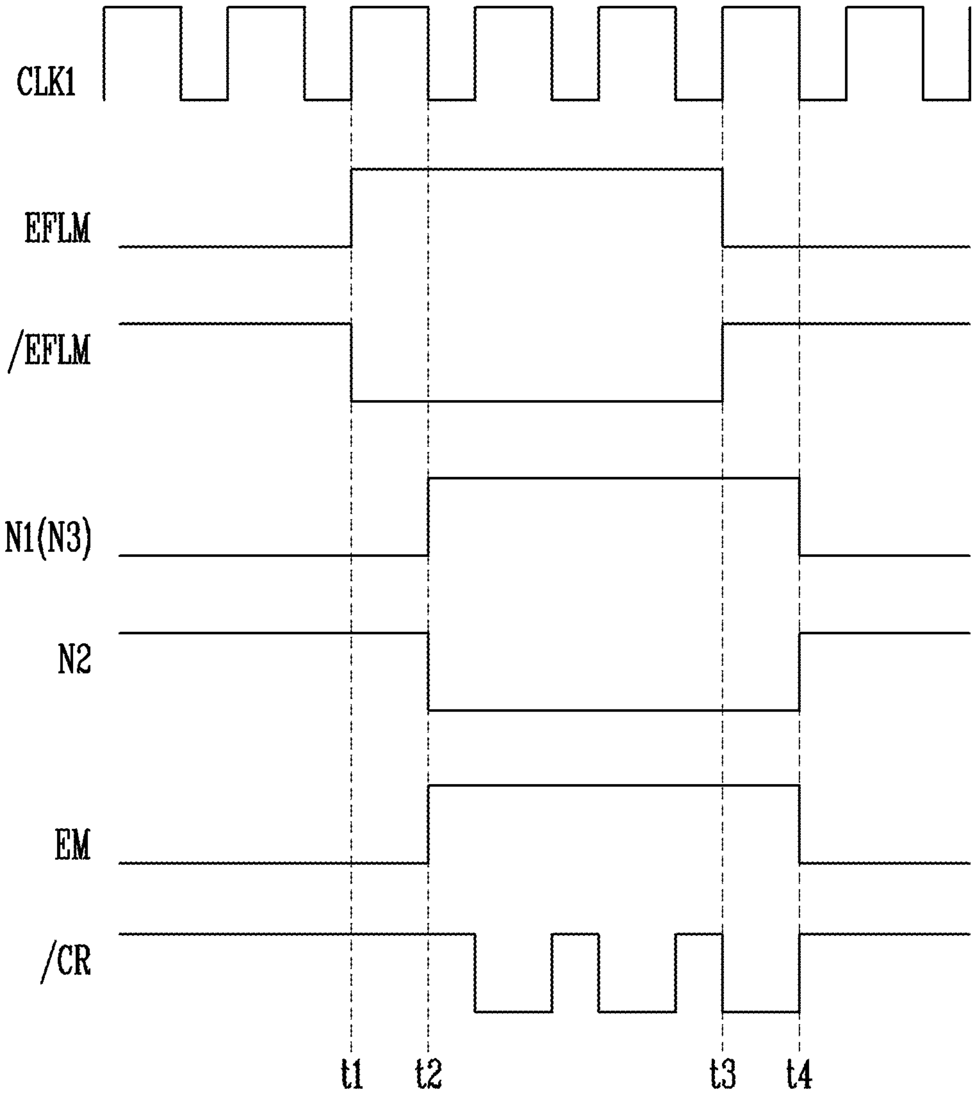
FIG. 10 is a waveform diagram illustrating a method of driving the stage circuit shown in FIG. 9 in accordance with an embodiment of the present disclosure.

FIG. 10 is a waveform diagram illustrating a method of driving the stage circuit shown in FIG. 9 in accordance with an embodiment of the present disclosure.

Referring to FIG. 10, at a first time t1, an emission start signal EFLM may be input to the first input terminal IN1, and a reverse emission start signal /EFLM may be input to the second input termina IN2. For example, the emission start signal EFLM may have a second level voltage, and the reverse emission start signal /EFLM may have a first level voltage. The first clock signal CLK1 may have the second level voltage, and accordingly, the third transistor T3 and the fourth transistor T4 may be turned off.

At a second time t2, the first clock signal CLK1 may have the first level voltage, and accordingly, the third transistor T3 and the fourth transistor T4 may be turned on. When the third transistor T3 is turned on, the first level voltage of the second input terminal IN2 may be supplied to the second node N2. When the fourth transistor T4 is turned on, the second voltage level of the first input terminal IN1 may be supplied to the third node N3 (and the first node N1).

When the second node N2 has the first level voltage, the first transistor T1 may be turned on. When the first transistor T1 is turned on, the voltage of the fourth power source VGH may be supplied to the first output terminal OUT1. The voltage of the fourth power source VGH, which is supplied to the first output terminal OUT1, may be supplied as the second level emission control signal EM to the emission control line.

When the first node N1 and the third node N3 have the second level voltage, the fifth transistor M5 may be turned on, and the second transistor T2 and the eighth transistor T8 may be turned off. When the second transistor T2 is turned off, the first output terminal OUT1 and the first power input terminal VIN1 may be electrically disconnected, and accordingly, the voltage of the fourth power source VGH can be stably supplied to the first output terminal OUT1.

When the fifth transistor T5 is turned on, the voltage of the second power source VGL2 may be supplied to the second node N2, and the second node N2 may stably maintain the first level voltage.

When the eighth transistor T8 is turned off, the second output terminal OUT2 may be in a floating state. A voltage of the second output terminal OUT2 may be changed to the first level and the second level, corresponding to a voltage of a second clock signal CLK2, which is supplied to a next stage circuit.

Additionally, when the third node N3 has the second level voltage, the second node N2 may be set to the first level voltage by the fifth transistor T5. Therefore, a component supplying a reverse carry signal /CR to the second output terminal OUT2, e.g., the third transistor T3 and the eighth transistor T8 may be omitted, if necessary.

At a third time t3, the input of the emission start signal EFLM to the first input terminal IN1 may be stopped, and the input of the reverse emission start signal /EFLM to the second input terminal IN2 may be stopped. For example, the emission start signal EFLM may have a first level voltage, and the reverse emission start signal /EFLM may have a second level voltage. The first clock signal CLK1 may have the second level voltage, and accordingly, the third transistor T3 and the fourth transistor T4 may be turned off.

At a fourth time t4, the first clock signal CLK1 may have the first level voltage, and accordingly, the third transistor T3 and the fourth transistor T4 may be turned on. When the third transistor T3 is turned on, the second level voltage of the second input terminal IN2 may be supplied to the second node N2. When the fourth transistor T4 is turned on, the first level voltage of the first input terminal IN1 may be supplied to the third node N3 (and the first node N1).

When the second node N2 has the second level voltage, the first transistor T1 may be turned off, and the sixth transistor T6 may be turned on. When the first transistor T1 is turned off, the electrical connection between the fourth power input terminal VIN4 and the first output terminal OUT1 may be interrupted. When the sixth transistor T6 is turned on, the second power input terminal VIN2 and the third node N3 may be electrically connected to each other, and the third node N3 may have the voltage of the second power source VGL2, i.e., the first voltage level.

The first node N1 and the third node N3 have the first level voltage, the fifth transistor T5 may be turned off, and the second transistor T2 and the eighth transistor T8 may be turned on. When the second transistor T2 is turned on, the first output terminal OUT1 and the first power input terminal VIN1 may be electrically connected to each other, and accordingly, the voltage of the first power source VGL1 may be supplied to the first output terminal OUT1. The voltage of the first power source VGL1, which is supplied to the first output terminal OUT1, may be supplied as the first level emission control signal EM to the emission control line.

When the eighth transistor T8 is turned on, the voltage of the fourth power source VGH may be supplied to the second output terminal OUT2. The voltage of the fourth power source VGH, which is supplied to the second output terminal OUT2, may be supplied as a second level reverse carry signal /CR to a next stage circuit.

Figure 11:
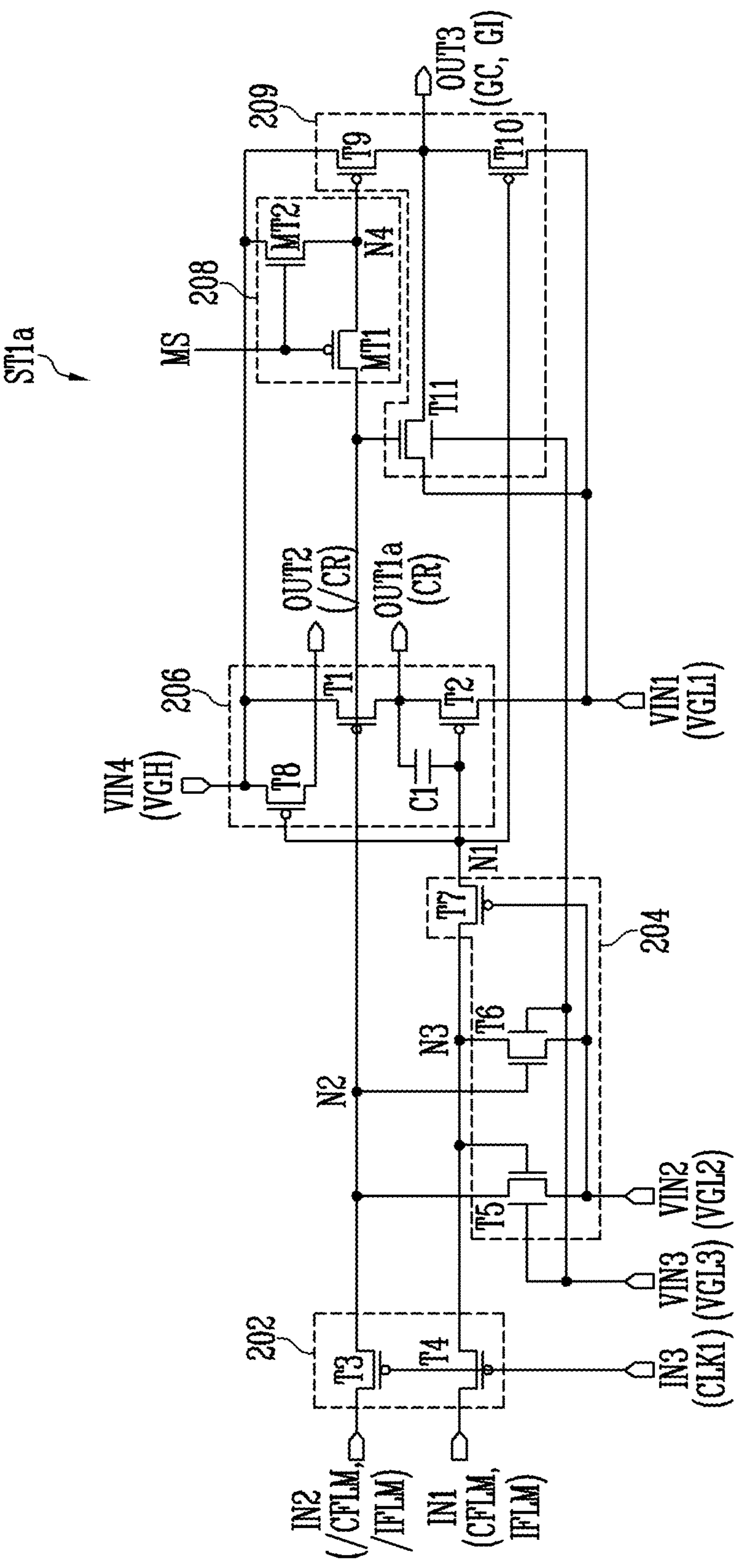
FIG. 11 is a diagram illustrating the stage circuit of the compensation driver and the initialization driver shown in FIG. 8 in accordance with an embodiment of the present disclosure.

FIG. 11 is a diagram illustrating the stage circuit of the compensation driver and the initialization driver shown in FIG. 8 according to an embodiment. For convenience of description, a first stage circuit ST1*a* is illustrated in FIG. 11. The stage circuit ST1*a* shown in FIG. 11 may be included in each of the compensation driver 134 and/or the initialization driver 136, and the stage circuit ST1 shown in FIG. 9 may be included in the emission driver 150. In FIG. 11, components substantially similar or identical to the components shown in FIG. 9 are designated by the same reference numerals, and their detailed descriptions will be omitted.

Referring to FIG. 11, the stage circuit ST1*a* in accordance with an embodiment of the present disclosure may include an input unit 202, a controller 204, an output unit 206 (or first output unit), a masking unit 208, and a second output unit 209.

The first output unit 206 may be connected to a first power input terminal VIN1 and a fourth power input terminal VIN4, and control a voltage of each of a first output terminal OUT1*a* and a second output terminal OUT2 in response to a voltage of each of a first node N1 (or first control node) and a second node N2 (or second control node). The first output unit 206 may include a first transistor T1, a second transistor T2, an eighth transistor T8, and a first capacitor C1.

The first output unit 206 may output a carry signal CR to the first output terminal OUT1*a*. A process of outputting the carry signal CR may be identical to a process of outputting the emission control signal EM shown in FIG. 9, and therefore, its detailed descriptions will be omitted.

The second output unit 209 may be connected to the first power input terminal VIN1 and the fourth power input terminal VIN4, and control a voltage of a third output terminal OUT3 in response to a voltage of each of the first node N1 and a fourth node N4 (or third control node). The second output unit 209 may include a ninth transistor T9, a tenth transistor T10, and an eleventh transistor T11.

The ninth transistor T9 may be connected between the fourth power input terminal VIN4 and the third output terminal OUT3. In addition, a gate electrode of the ninth transistor T9 may be connected to the fourth node N4. The ninth transistor T9 may control an electrical connection between the fourth power input terminal VIN4 and the third output terminal OUT3 by being turned on or turned off in response to a voltage of the fourth node N4. When the fourth power input terminal VIN4 and the third output terminal OUT3 are electrically connected to each other, a voltage of a fourth power source VGH may be supplied to the third output terminal OUT3. The voltage of the fourth power source VGH, which is supplied to the third output terminal OUT3, may be supplied as a second level second scan signal GC (or a second level third scan signal GI) to a second scan line (or a third scan line).

The tenth transistor T10 may be connected between the first power input termina VIN1 and the third output terminal OUT3. In addition, a gate electrode of the tenth transistor T10 may be connected to the first node N1. The tenth transistor T10 may control an electrical connection between the first power input terminal VIN1 and the third output terminal OUT3 by being turned on or turned off in response to a voltage of the first node N1. When the first power input terminal VIN1 and the third output terminal OUT3 are electrically connected to each other, a voltage of a first power source VGL1 may be supplied to the third output terminal OUT3. The voltage of the first power source VGL1, which is supplied to the third output terminal OUT3, may be supplied as a first level second scan signal GC (or a first level third scan signal GI) to the second line (or the third scan line).

The eleventh transistor T11 may be connected between the third output terminal OUT3 and the first power input terminal VIN1. In addition, a gate electrode of the eleventh transistor T11 may be connected to the second node N2, and a body electrode of the eleventh transistor T11 may be connected to a third power input terminal VIN3. The eleventh transistor T11 may control an electrical connection between the third output terminal OUT3 and the first power input terminal VIN1 in response to a voltage of the second node N2. Additionally, the body electrode of the eleventh transistor T11 may be connected to a second power input terminal VIN2.

The eleventh transistor T11 may be turned, when the voltage of the second node N2 shown in FIG. 10 is set to have the second level voltage (e.g., before t2 and after t4), to supply the voltage of the first power source VGL1 to the third output terminal OUT3. The voltage of the first power source VGL1, which is supplied to the third output terminal OUT3, may be supplied as the first level second scan signal GC (or the first level third scan signal GI) to the second scan line (or the third scan line). In an embodiment, the tenth transistor T10 or the eleventh transistor T11 may be omitted, if necessary.

The ninth transistor T9 and the tenth transistor T10 may be formed with a P-type transistor such that a fast switching operation is possible, and the eleventh transistor T11 may be formed with an N-type transistor such that a leakage current can be minimized.

The masking unit 208 may control an electrical connection between the second node N2 and the fourth node N4 in response to a masking signal MS supplied from the output controller 170. The masking unit 208 may include a first masking transistor MT1 and a second masking transistor MT2.

The first masking transistor MT1 may be connected between the second node N2 and the fourth node N4. In addition, a gate electrode of the first masking transistor MT1 may be supplied with the masking signal MS. The first masking transistor MT1 may be turned on when a first level masking signal MS is supplied and may connect the second node N2 to the fourth node N4.

The second masking transistor MT2 may be connected between the fourth power input terminal VIN4 and the fourth node N4. In addition, a gate electrode of the second masking transistor MT2 may be supplied with the masking signal MS. The second masking transistor MT2 may be turned on when a second level masking signal MS is supplied and may electrically connect the fourth node N4 to the fourth power input terminal VIN4.

The first masking transistor MT1 and the second masking transistor MT2 may be turned on or turned off in response to the masking signal MS. The first masking transistor MT1 may be formed with a P-type transistor, and the second masking transistor MT2 may be formed with an N-type transistor.

An operation process will be described hereinafter. As the first masking transistor MT1 is turned on when the first level masking signal MS is input, the second node N2 and the fourth node N4 may be electrically connected to each other. The ninth transistor T9 may be turned on in response to a voltage of the second node N2 (or the fourth node N4), and accordingly, a second level second scan signal GC (or a second level third scan signal GI) may be output to the third output terminal OUT3.

As the second masking transistor MT2 is turned on when the second level masking signal MS is input, the voltage of the fourth power source VGH may be supplied to the fourth node N4, and the ninth transistor T9 may be set to be in a turn-off state. When the ninth transistor T9 is in a turn-off state, the second level second scan signal GC (or the second level third scan signal GI) may not be output to the third output terminal OUT3, regardless of the voltage of the second node N2.

As described above, in the embodiment of the present disclosure, the output of the second scan signal GC and the third scan signal GI may be controlled based on the masking signal MS, and accordingly, the plurality of areas of the display unit 110 can be driven at different driving frequencies.

Figure 12:
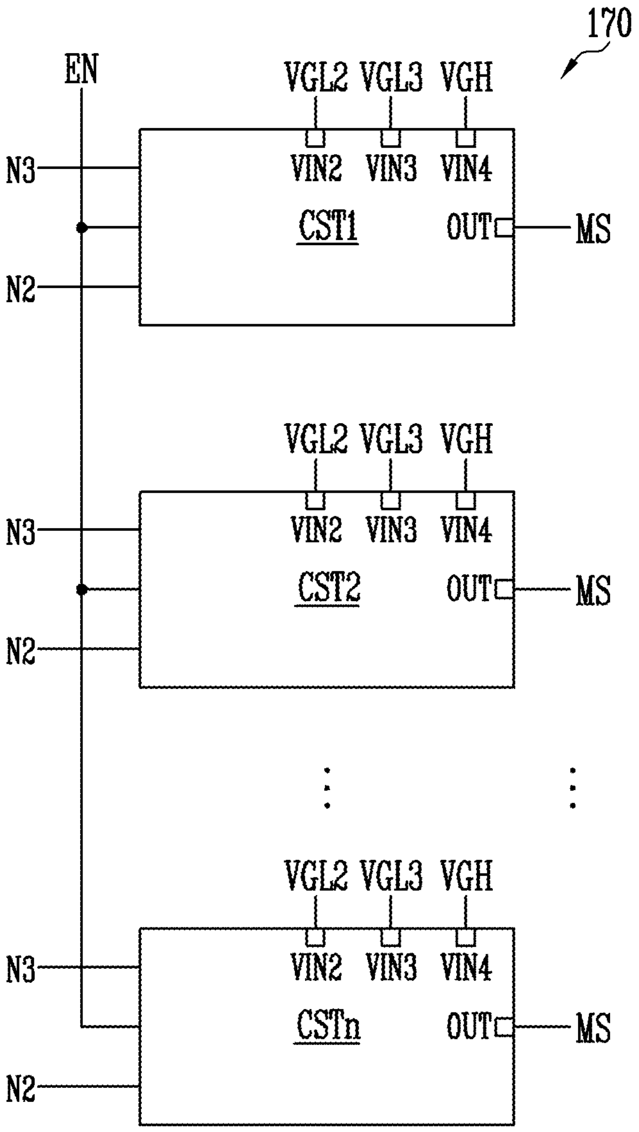
FIG. 12 is a view illustrating a control stage circuit of an output controller in accordance with an embodiment of the present disclosure.

FIG. 12 is a view illustrating a control stage circuit of the output controller in accordance with an embodiment of the present disclosure.

Referring to FIG. 12, the output controller 170 according to an embodiment of the present disclosure may include control stage circuits CTS1, CTS2, . . . , and CTSn. Each of the control stage circuits CTS1, CTS2, . . . , and CTSn may supply a masking signal MS to a stage circuit (or initialization stage circuit) of the initialization driver 136 and a stage circuit (or compensation stage circuit) of the compensation driver 134, which are located on the same horizontal line.

For example, a first control stage circuit CST1 may be electrically connected to a second node N2 and a third node N3 of a stage circuit ST1 of the emission driver 150, which is located on a first horizontal line, and receive an enable signal EN input from the timing controller 120. The first control stage circuit CST1 may supply a first level masking signal MS or a second level masking signal MS to a stage circuit ST1*a* of the compensation driver 134 and a stage circuit ST1*a* of the initialization driver 136, which are located on the first horizontal line, based on a voltage of each of the second node N2 and the third node N3 of the stage circuit ST1 of the emission driver 150 and a voltage of the enable signal EN (i.e., a first level or a second level).

A second control stage circuit CST2 may be electrically connected to a second node N2 and a third node N3 of a stage circuit ST2 of the emission driver 150, which is located on a second horizontal line, and receive the enable signal EN input from the timing controller 120. The second control stage circuit CST2 may supply the first level masking signal MS or the second level masking signal MS to a stage circuit ST2*a* of the compensation driver 134 and a stage circuit ST2*a* of the initialization driver 136, which are located on the second horizontal line, based on a voltage of each of the second node N2 and the third node N3 of the stage circuit ST2 of the emission driver 150 and the voltage of the enable signal EN (i.e., the first level or the second level).

An n-th control stage circuit CSTn may be electrically connected to a second node N2 and a third node N3 of a stage circuit STn of the emission driver 150, which is located on an n-th horizontal line, and receive the enable signal EN input from the timing controller 120. The n-th control stage circuit CSTn may supply the first level masking signal MS or the second level masking signal MS to a stage circuit STna of the compensation driver 134 and a stage circuit STna of the initialization driver 136, which are located on the n-th horizontal line, based on a voltage of each of the second node N2 and the third node N3 of the stage circuit STn of the emission driver 150 and the voltage of the enable signal EN (e.g., the first level or the second level).

Figure 13:
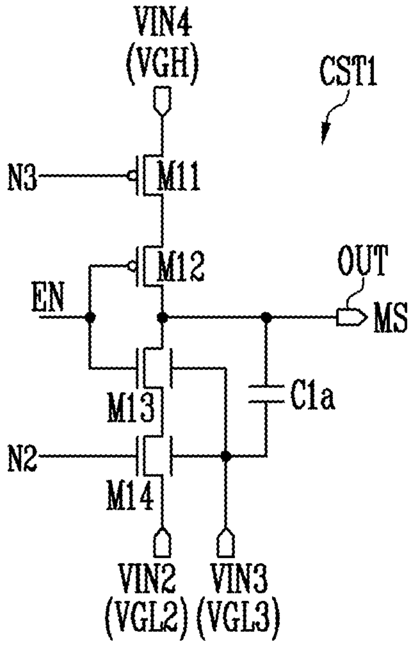
FIG. 13 is a diagram illustrating the control stage circuit of the output controller shown in FIG. 12 in accordance with an embodiment of the present disclosure.

FIG. 13 is a diagram illustrating the control stage circuit of the output controller shown in FIG. 12. For convenience of description, the first control stage circuit CST1 is illustrated in FIG. 13.

Referring to FIGS. 9 and 13, the control stage circuit CST1 of the output controller 170 according to an embodiment may include a first transistor M11 (or first control transistor) and a second transistor M12 (or second control transistor), which are connected in series between a fourth input terminal VIN4 and an output terminal OUT. A gate electrode of the first transistor M11 may be connected to the third node N3 of the stage circuit ST1 of the emission driver 150, and a gate electrode of the second transistor M12 may be supplied with the enable signal EN.

The control stage circuit CST1 of the output controller 170 may further include a third transistor M13 (or third control transistor) and a fourth transistor M14 (or a fourth control transistor), which are connected in series between the output terminal OUT and a second power input terminal VIN2. A gate electrode of the third transistor M13 may be supplied with the enable signal EN, and a gate electrode of the fourth transistor M14 may be connected to the second node N2 of the stage circuit ST1 of the emission driver 150. In addition, a body electrode of the third transistor M13 and a body electrode of the fourth transistor M14 may be connected to a third power input terminal VIN3.

In an embodiment, the first transistor M11 and the second transistor M12 may be formed with a P-type transistor, and the third transistor M13 and the fourth transistor M14 may be formed with an N-type transistor.

The control stage circuit CST1 of the output controller 170 may further include a capacitor C1*a* connected between the output terminal OUT and the third power input terminal VIN3. The capacitor C1*a* may store a voltage of the output terminal OUT.

Figure 14:
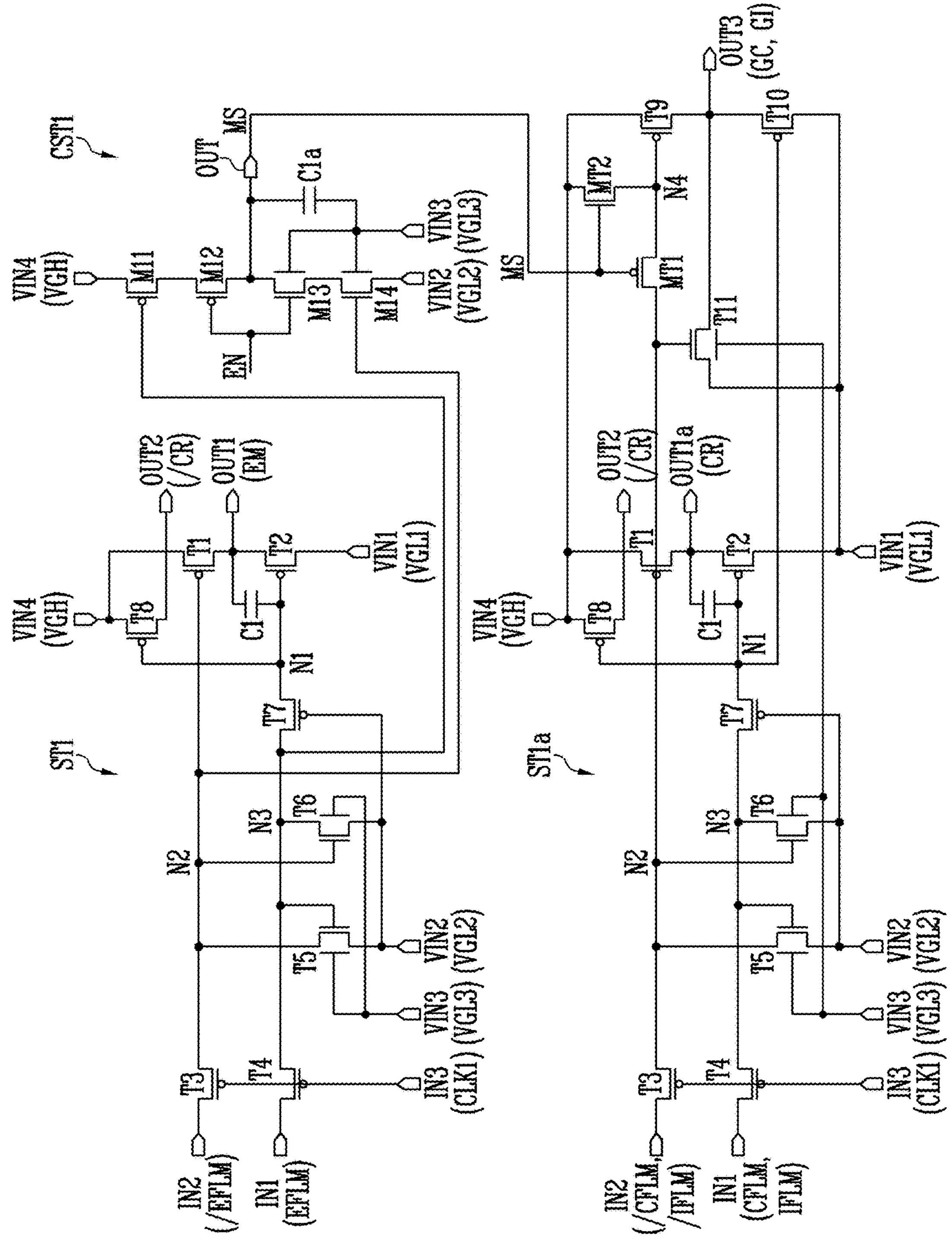
FIG. 14 is a diagram illustrating a connection relationship between a stage circuit and a control stage circuit, which are located on the same horizontal line, in accordance with an embodiment of the present disclosure.

FIG. 14 is a diagram illustrating a connection relationship between a stage circuit and a control stage circuit, which are located on the same horizontal line. Although one stage circuit ST1*a* is illustrated in FIG. 14, the present disclosure is not limited thereto. For example, a stage circuit of the compensation driver 134 and a stage circuit of the initialization driver 136 may have the same structure. However, start signals CFLM and IFLM and reverse start signals /CFLM and /IFLM may have different forms.

Figure 15:
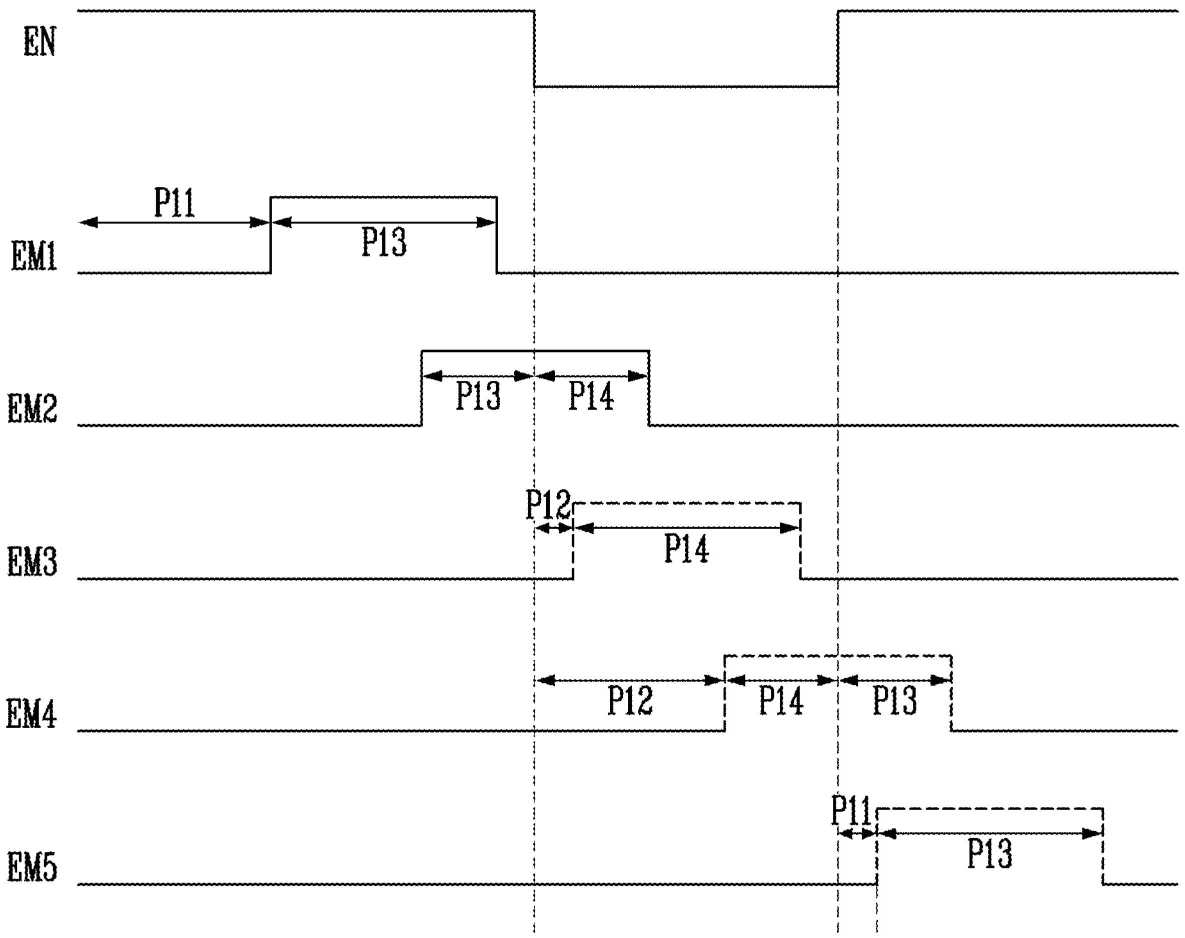
FIG. 15 is a diagram illustrating an operation process of a control stage circuit in accordance with an embodiment of the present disclosure.

FIG. 15 is a diagram illustrating an operation process of the control stage circuit according to an embodiment. In FIG. 15, an emission control signal indicated by a dotted line may represent that the second scan signal and the third scan signal are not supplied on a corresponding horizontal line.

Referring to FIGS. 10, 14, and 15, a period, e.g., a first period P11, in which a second level enable signal EN and a first level emission control signal EM are supplied, will be described as follows. When the second enable signal EN is supplied, the second transistor M12 may be turned off, and the third transistor M13 may be turned on. In addition, when the first level emission control signal EM is supplied, the second node N2 may be set to have a second level voltage, and accordingly, the fourth transistor M14 may be turned on.

As the third transistor M13 and the fourth transistor M14 may be turned on, the voltage of the second power source VGL2 may be supplied to the output terminal OUT. The voltage of the second power source VGL2, which is supplied to the output terminal OUT, may be supplied as first level masking signal MS to a stage circuit ST1*a* of the compensation driver 134 and the initialization driver 136, which are located on the same horizontal line as the control stage circuit CST1. The stage circuit ST1*a* may normally output the second scan signal GC and the third scan signal GI.

A period, e.g., a second period P12, in which a first level enable signal EN and a first level emission control signal EM are supplied, will be described as follows. When the first level enable signal EN is supplied, the second transistor M12 may be turned on, and the third transistor M13 may be turned off. In addition, when the first level emission control signal EN is supplied, the third node N3 may be set to have a first level voltage, and accordingly, the first transistor M11 may be turned on.

As the first transistor M11 and the second transistor M12 may be turned on, the voltage of the first power source VGH may be supplied to the output terminal OUT. The voltage of the first power source VGH, which is supplied to the output terminal OUT, may be supplied as a second masking signal MS to a stage circuit STa1 of the compensation driver 134 and the initialization driver 136, which are located on the same horizontal line as the control stage circuit. The stage circuit Sta1 may not output the second scan signal GC and the third scan signal GI.

A period, e.g., a third period P13, in which the second level enable signal EN and the second level emission control signal EM are supplied, will be described as follows. When the second level enable signal EN is supplied, the second transistor M12 may be turned off, and the third transistor M13 may be turned on. When the second level emission control signal EM is supplied, the second node N2 may be set to have the first level voltage, and accordingly, the fourth transistor M14 may be turned off. When the second level emission control signal EM is supplied, the third node N3 may be set to have the second level voltage, and accordingly, the first transistor M11 may be turned off.

Therefore, during the third period P13, the output terminal OUT may maintain a voltage of a previous period (i.e., a masking signal MS of the previous period) based on the voltage stored in the capacitor C1*a*.

A period, e.g., a fourth period P14, in which the first level enable signal EN and the second level emission control signal EM are supplied, will be described as follows. When the first level enable signal EN is supplied, the third transistor M13 may be turned off, and the second transistor M12 may be turned on. When the second level emission control signal EM is supplied, the second node N2 may be set to have the first level voltage, and accordingly, the fourth transistor M14 may be turned off. When the second level emission control signal EM is supplied, the third node N3 may be set to have the second level voltage, and accordingly, the first transistor M11 may be turned off.

Therefore, during the fourth period P14, the output terminal OUT may maintain a voltage of a previous period (i.e., a masking signal MS of the previous period) based on the voltage stored in the capacitor C1*a*. As such, when a voltage of a previous masking signal MS is maintained during the third period P13 and the fourth period P14, the stability of driving can be ensured.

Figure 16:
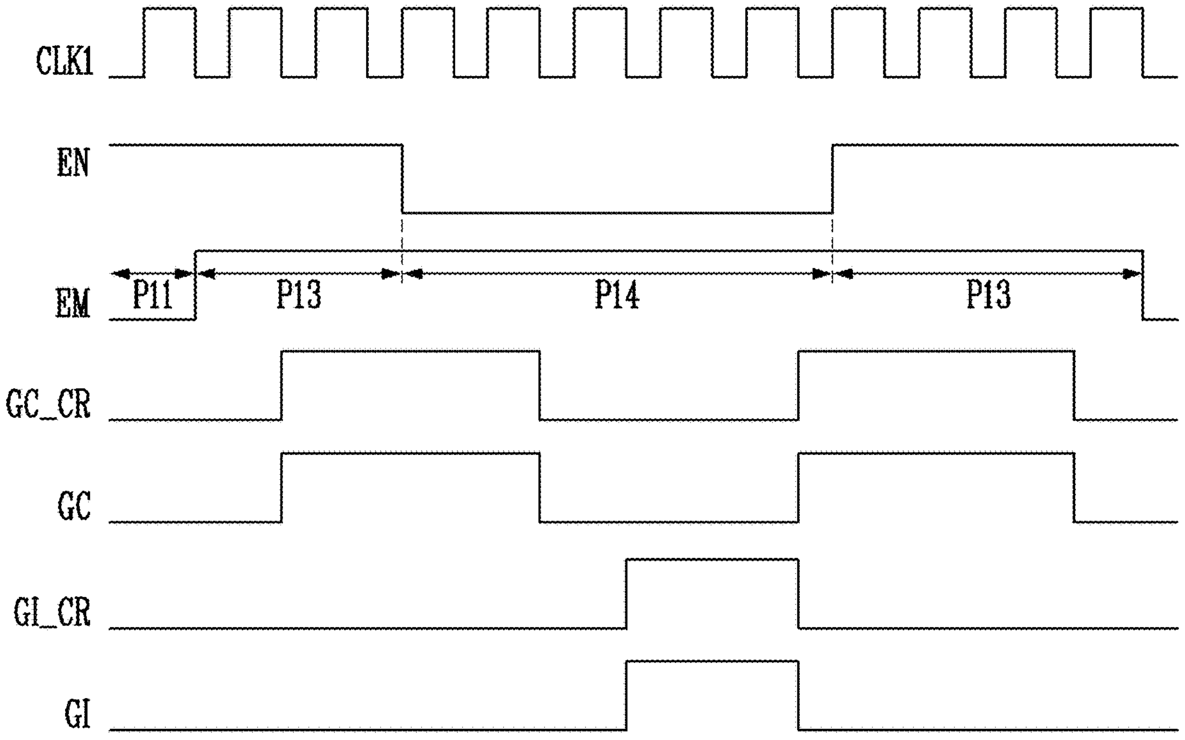
FIG. 16 is a waveform diagram illustrating a scan signal corresponding to a change of an enable signal in accordance with an embodiment of the present disclosure.

FIG. 16 is a waveform diagram illustrating a scan signal corresponding to a change of an enable signal in accordance with an embodiment of the present disclosure.

Referring to FIG. 16, during a period in which the second level emission control signal EM is supplied, the enable signal EN may be changed from the second level to the first level and changed from the first level to the second level.

A period in which the first level emission control signal is supplied may be referred to as a first period P11, and a period in which a second level enable signal EN and the second level emission control signal EM are supplied may be referred to as a third period P13. In addition, a period in which a first level enable signal EN and the second level emission control signal EM are supplied may be referred to as a fourth period P14.

That is, the period in which the second level emission control signal EM is supplied may include a third period P13, a fourth period P14, and a third period P13. The first period P11 may be a period in which the first level masking signal MS is supplied, and the third period P13, the fourth period P14 and the third period P13 may correspond to a period in which the first level masking signal MS is maintained.

Although the enable signal EN is changed from the second level to the first level during the period in which the second level emission control signal EM is supplied, the second scan signal GC and the third scan signal GI may be normally output. In addition, a carry signal GC_CR corresponding to the second scan signal GC and a carry signal GI_CR corresponding to the third scan signal GI may also be normally output.

That is, in an embodiment of the present disclosure, although the enable signal EN is changed from the second level to the first level after the second level emission control signal EM is supplied, the second scan signal GC and the third scan signal GI may be normally output, and accordingly, the stability of driving can be ensured.

Figure 17:
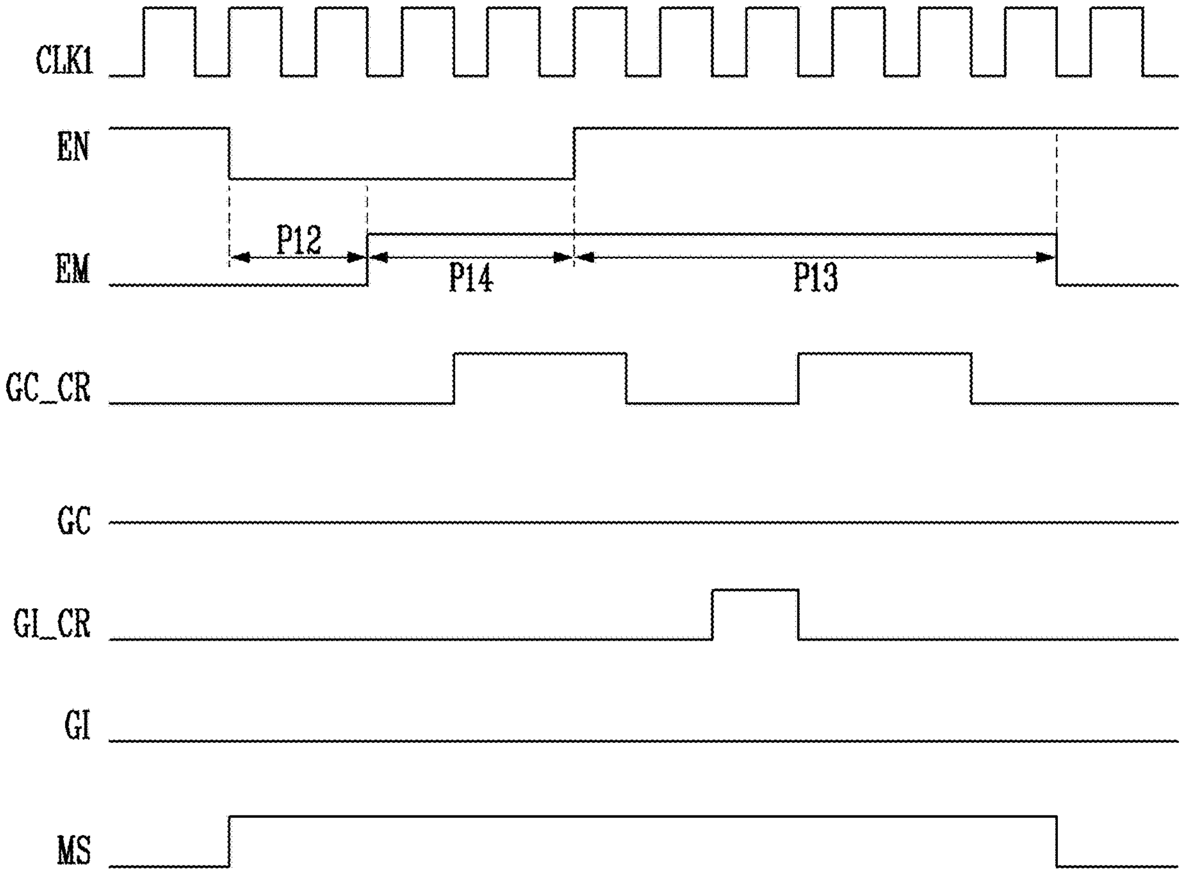
FIG. 17 is a waveform diagram illustrating a scan signal corresponding to a change of an enable signal in accordance with an embodiment of the present disclosure.

FIG. 17 is a waveform diagram illustrating a scan signal corresponding to a change of an enable signal according to an embodiment.

Referring to FIG. 17, the enable signal EN may be set to have the first level (i.e., the first level enable signal EN) before the second level emission control signal EM is supplied, and be changed to the second level (i.e., the second level enable signal EN) after the second level emission control signal EM is supplied.

A period before the second level emission control signal EM is supplied may be referred to as a second period P12, and a period in which a first level enable signal EN and the second level emission control signal EM are supplied may be referred to as a fourth period P14. In addition, a period in which a second level enable signal EN and the second level emission control signal EM are supplied may be referred to as a third period P13.

That is, the period in which the second level emission control signal is supplied may include a fourth period P14 and a third period P13. The second period P12 may be a period in which the second level masking signal MS is supplied, and the fourth period P14 and the third period P13 may correspond to a period in which the second level masking signal MS is maintained.

Although the enable signal EN is changed from the first level to the second level during the period in which the second level emission control signal EM is supplied, the second scan signal GC and the third scan signal GI may not be output. However, a carry signal GC_CR corresponding to the second scan signal GC and a carry signal GI_CR corresponding to the third scan signal GI may be normally output.

That is, in an embodiment of the present disclosure, although the enable signal EN is changed from the first level to the second level after the second level emission control signal EM is supplied, the second scan signal GC and the third scan signal GI may not be output, and accordingly, a driving frequency may be differently set for each area.

As described above, according to an embodiment of the present disclosure, the level of the enable signal EN is controlled for each area of the display unit 110, so that the areas of the display unit 110 can be driven at different frequencies.

Additionally, when the second scan signal GC and the third scan signal GI are not supplied, the third transistor M3 and the fourth transistor M4, which are shown in FIG. 4, are maintained in a turn-off state, thereby maintaining a data signal supplied in a previous period.

Figure 18:
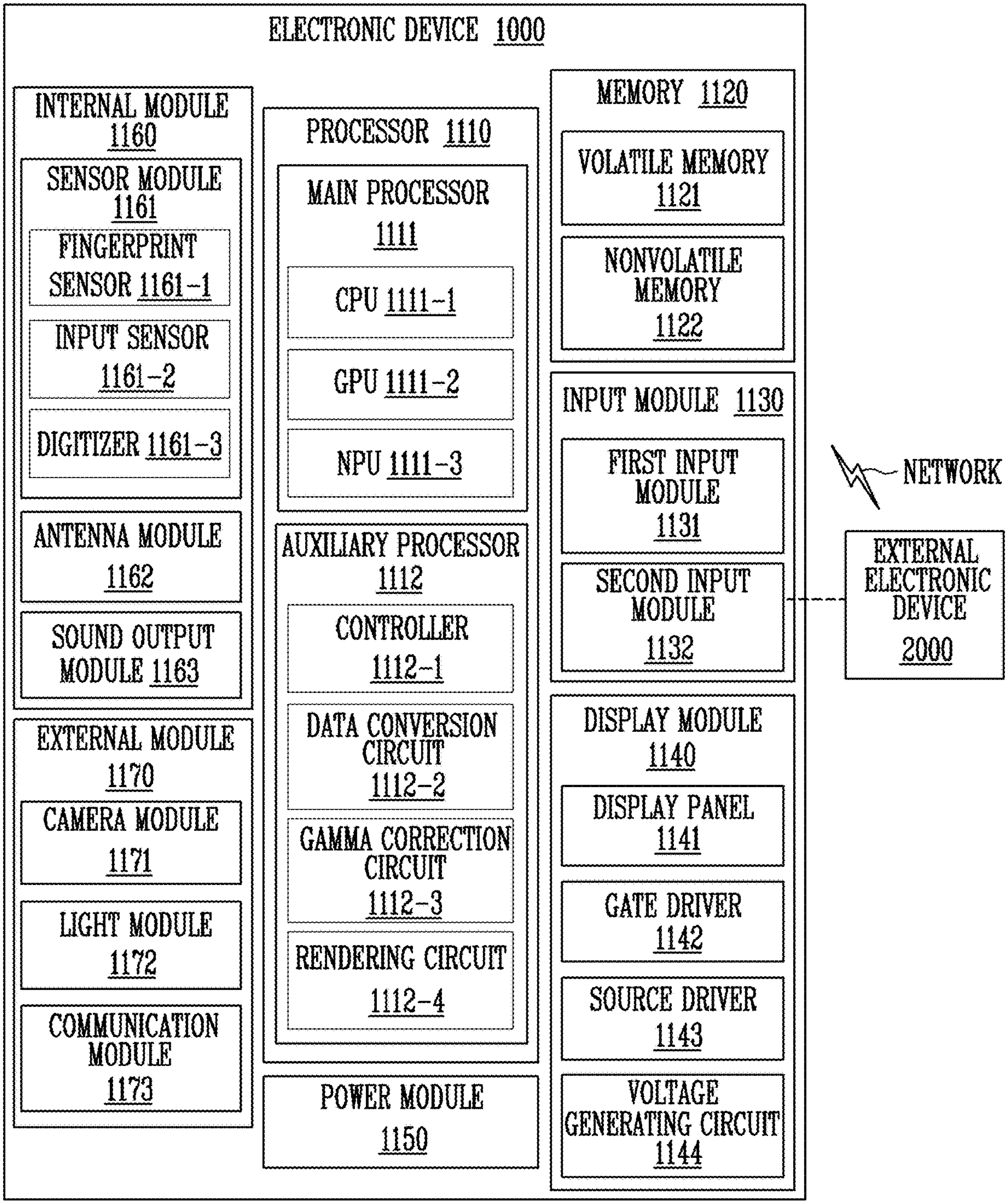
FIG. 18 is a diagram illustrating an electronic device in accordance with an embodiment of the present disclosure.

FIG. 18 is a diagram illustrating an electronic device in accordance with an embodiment of the present disclosure.

Referring to FIG. 18, the electronic device 1000 in accordance with the embodiment of the present disclosure may output various information through a display module 1140. When a processor 1110 executes an application stored in a memory 1120, the display module 1140 may provide application information to a user through a display panel 1141.

The processor 1110 may acquire an external input through an input module 1130 or a sensor module 1161, and execute an application corresponding to the external input. For example, when the user selects a camera icon (or camera application icon) displayed on the display panel 1141, the processor 1110 may acquire a user input through an input sensor 1161-2, and activate a camera module 1171. The processor 1110 may transfer, to the display module 1140, image data corresponding to a photographed image acquired through the camera module 1171. The display module 1140 may display an image corresponding to the photographed image through the display panel 1141.

For example, when personal information authentication is executed in the display module 1140, a fingerprint sensor 1161-1 may acquire input fingerprint information as input data. The processor 1110 may compare the input data acquired through the fingerprint sensor 1161-1 with authentication data stored in the memory 1120, and execute an application according to a comparison result. The display module 1140 may display information executed according to a logic of the application through the display panel 1141. The fingerprint sensor 1161-1 may be disposed to acquire fingerprint information in the entire area of the display panel 1141.

For example, when a music streaming icon displayed on the display module 1140 is selected, the processor 1110 may acquire a user input through the input sensor 1161-2, and active a music streaming application stored in the memory 1120. When a music play command is input in the music streaming application, the processor 1110 may activate a sound output module 1163, thereby providing the user with sound information which accords with the music play command.

In the above, operations of the electronic device 1000 have been briefly described. Hereinafter, components of the electronic device 1000 will be described in detail. Some of the components of the electronic device 1000, which will be described later, may be integrated and provided as one component, and one component may be divided and provided as two or more components.

The electronic device 1000 may communicate with an external electronic device 2000 through a network (e.g., a short-range wireless communication network or a long-range wireless communication network). In accordance with an embodiment, the electronic device 1000 may include the processor 1110, the memory 1120, the input module 1130, the display module 1140, a power module 1150, an internal module 1160, and an external module 1170. In accordance with an embodiment, in the electronic device 1000, at least one of the above-described components may be omitted, or one or more other components may be added. In accordance with an embodiment, some components (e.g., the sensor module 1161, an antenna module 1162, and/or the sound output module 1163) among the above-described components may be integrated in another component (e.g., the display module 1140).

The processor 1110 may control at least another component (e.g., a hardware or software component) of the electronic device 1000, which is connected to the processor 1110, by executing software, and perform various processing or calculations. In accordance with an embodiment, as at least a part of the data processing and calculations, the processor 1110 may store a command or data, received from another component (e.g., the input module 1130, the sensor module 1161, or a communication module 1173) in a volatile memory 1121, process the command or data stored in the volatile memory 1121, and store result data in a nonvolatile memory 1122.

The processor 1110 may include a main processor 1111 and an auxiliary processor 1112. The main processor 1111 may include at least one of a central processing unit (CPU) 1111-1 or an application processor (AP). The main processor 1111 may further include at least one of a graphic processing unit (GPU) 1111-2, a communication processor (CP), or an image signal processor (ISP). The main processor 1111 may further include a neural processing unit (NPU) 1111-3. The NPU 1111-3 is a processor specified for processing an artificial intelligence (AI) model, and the AI model may be generated through machine learning. The AI model may include a plurality of artificial neural network layers. An artificial neural network may be a deep neural network (DNN), a convolutional neural network (CNN), a recurrent neural network (RNN), a restricted boltzman machine (RBM), a deep belief network (DBN), a bidirectional recurrent deep neural network (BRDNN), a deep Q-networks, or one of two or more combinations thereof, but the present disclosure is not limited to the above-described example. The AI model may include a software structure, in addition to a hardware structure. At least two of the above-described processing units and the above-described processors may be implemented into one integrated component (e.g., a single chip), or be implemented as components (e.g., a plurality of chips) independent from each other.

The auxiliary processor 1112 may include a controller 1112-1. The controller 1112-1 may include an interface conversion circuit and a timing control circuit. For example, the controller 1112-1 may include the timing controller 120 shown in FIG. 2. The controller 1112-1 may receive an image signal from the main processor 1111, convert a data format of the image signal to match interface specifications of the display module 1140, and output image data. The controller 1112-1 may output various control signals to drive the display module 1140. Additionally, the controller 1112-1 may provide the display module 1140 with the enable signal shown in FIG. 15.

The auxiliary processor 1112 may further include a data conversion circuit 1112-2, a gamma correction circuit 1112-3, a rendering circuit 1112-4, and a touch control circuit which is not shown, and the like. The data conversion circuit 1112-2 may receive image data from the controller 1112-1, and compensate the image data in order for the display module 1140 to display an image with a desired luminance based on a characteristic of the electronic device 1000 or a setting of the user. In addition, the data conversion unit 1112-2 may convert the image data to reduce power consumption or compensate for an afterimage.

The gamma correction circuit 1112-3 may convert image data, a gamma reference voltage, or the like such that an image displayed in the electronic device 1000 has a desired gamma characteristic. The rendering circuit 1112-4 may receive image data from the controller 1112-1, and render the image data by considering a pixel arrangement of the display panel 1141, and the like, applied to the electronic device 1000.

The touch control circuit may supply a touch driving signal to the input sensor 1161-2, and be supplied with a sensing signal from the input sensor 1161-2 in response to the touch driving signal.

At least one of the data conversion circuit 1112-2, the gamma correction circuit 1112-3, the rendering circuit 1112-4, or the touch control circuit may be integrated in another component (e.g., the main processor 1111 or the controller 1112-4). At least one of the data conversion circuit 1112-2, the gamma correction circuit 1112-3, or the rendering circuit 1112-4 may be integrated into a source driver 1143 which will be described later.

The memory 1120 may store various data used by at least one component (e.g., the processor 1110 or the sensor module 1161) of the electronic device 1000, as well as input or output data about a command associated therewith. Also, various setting data corresponding to the setting of the user the memory 1120 may be stored in the memory 1120. The memory 1120 may include at least one of the volatile memory 1121 or the nonvolatile memory 1122.

The input module 1130 may receive a command or data to be used in a component (e.g., the processor 1110, the sensor module 1161, or the sound output module 1163) of the electronic device 1000 from the outside (e.g., the user or the external electronic device 2000) of the electronic device 1000.

The input module 1130 may include a first input module 1131 to which a command or data is input from the user and a second input module 1132 to which a command or data is input from the external electronic device 2000. The first input module 1131 may include a microphone, a mouse, a keyboard, a key (e.g., a button), or a pen (e.g., a passive pen or an active pen). The second input module 1132 may support a specified protocol capable of connecting the electronic device 1000 to the external electronic device 2000 by wired or wireless. In accordance with an embodiment, the second input module 1132 may include a high definition multimedia interface (HDMI), a universal serial bus (USB) interface, an SD card interface, or an audio interface. The second input module 1132 may include a connector, e.g., an HDMI connector, a USB connector, an SD card connector, or an audio connector (e.g., a headphone connector), which can physically connect the electronic device 1000 to the external electronic device 2000.

The display module 1140 may visually provide information to the user. The display module 1140 may include the display panel 1141, a gate driver 1142, and the source driver 1143. The display module 1140 may further include a window for protecting the display panel 1141, a chassis, and/or a bracket.

The display panel 1141 (or display) may include a liquid crystal display panel, an organic light emitting display panel, or an inorganic light emitting display panel. However, the kind of the display panel 1141 is not particularly limited thereto. The display panel 1141 may be of a rigid type or a flexible type in which the display panel 1141 is rollable or foldable. The display module 1140 may further include a supporter for supporting the display panel 1141, a bracket, a heat dissipation member, or the like.

The display panel 1141 may receive image data from the auxiliary processor 1112, and display an image while controlling an amount of the driving current supplied from a first driving power source VDD to a second driving power source VSS via pixels PX, corresponding to the image data. The display panel 1141 may correspond to the display unit 110 shown in FIG. 2.

The gate driver 1142 is a driving chip, and may be mounted on the display panel 1141. Also, the gate driver 1142 may be integrated in the display panel 1141. For example, the gate driver 1142 may include an Amorphous Silicon TFT Gate (ASG) driver circuit, a Low Temperature Polycrystalline Silicon (LTPS) TFT gate driver circuit, or an Oxide Semiconductor TFT Gate (OSG) driver circuit, which is embedded in the display panel 1141. The gate driver 1142 may receive a control signal from the controller 1112-1, and output scan signals to the display panel 1141 in response to the control signal. The gate driver 1142 may correspond to the scan driver 130 shown in FIG. 2.

The display module 1140 may further include an emission driver. The emission driver may output an emission control signal to the display panel 1141 in response to a control signal received from the controller 1112-1. The emission driver may be formed separately from the gate driver 1142, or be integrated in the gate driver 1142. The emission driver may correspond to the emission driver 150 shown in FIG. 2.

The display module 1140 may further include the output controller 170 shown in FIG. 3. The output controller 170 may include control stage circuits CST1 to CSTn. Each of the control stage circuits CST1 to CSTn may supply a masking signal MS to a stage circuit (or initialization stage circuit) of the initialization driver 136 and a stage circuit (or compensation stage circuit) of the compensation driver 134, which are located on the same horizontal line.

The source driver 1143 may receive a control signal from the controller 1112-1, convert image data into an analog voltage (e.g., a data voltage) and output data voltages to the display panel 1141 in response to the control signal. The source driver 1143 may correspond to the data driver 140 shown in FIG. 2.

The source driver 1143 may be integrated into another component (e.g., the controller 1112-1). Functions of the interface conversion circuit and the timing control circuit of the controller 1112-1, which are described above, may be integrated into the source driver 1143.

The display module 1140 may further include a voltage generating circuit 1144. The voltage generating circuit 1144 may output various voltages for driving the display panel 1141. For example, the voltage generating circuit 1144 may correspond to the power supply 160 shown in FIG. 2.

In an embodiment, the source driver 1143 may convert data corresponding to red (R), green (G), and blue (B), included in image data received from the processor 1110, into a red data signal (or data voltage), a green data signal, and a blue data signal, and provide the red data signal, the green data signal, and the blue data signal to a plurality of pixel columns included in the display panel 1141 during one horizontal period.

The power module 1150 may supply power to at least one component of the electronic device 1000. The power module 1150 may include a battery for charging a power voltage. The battery may include a primary cell which is not rechargeable, a secondary cell which is rechargeable, or a fuel cell. The power module 1150 may include a power management integrated circuit (PMIC). The PMIC may supply an optimized power source to each of the above-described modules and modules which will be described later. The power module 1150 may include a wireless power transmission/reception member electrically connected to the battery. The wireless power transmission/reception member may include a plurality of coil-shaped antenna radiators. The voltage generating circuit 1144 may be integrated in the power module 1150.

The electronic device 1000 may further include the internal module 1160 and the external module 1170. The internal module 1160 may include the sensor module 1161, the antenna module 1162, and the sound output module 1163. The external module 1170 may include the camera module 1171, a light module 1172, and the communication module 1173.

The sensor module 1161 may sense an input caused by a body of the user or an input caused by a pen in the first input module, and generate an electrical signal or a data value, which corresponds to the input. The sensor module 1161 may include at least one of the fingerprint sensor 1161-1, the input sensor 1161-2, or a digitizer 1161-3.

The fingerprint sensor 1161-1 may generate a data value corresponding to a fingerprint of the user. The fingerprint sensor 11601 may include any one of an optical type fingerprint sensor and a capacitive type fingerprint sensor.

The input sensor 1161-2 may generate a data value corresponding to coordinate information of the input caused by the body of the user or the input caused by the pen. The input sensor 1161-2 may generate, as a data value, a capacitance variation caused by the input. The input sensor 1161-2 may sense an input caused by a passive pen, or may transmit or receive data to or from an active pen.

The input sensor 1161-2 may measure a biometric signal such as blood pressure, hydration level, or body fat. For example, when the user does not move for a constant time while a part of the user's body is in contact with a sensor layer or a sensing panel, the input sensor 1161-2 may sense a biometric signal based on a change in an electric field caused by the part of the user's body and output desired information to the display module 1140.

The digitizer 1161-3 may generate a data value corresponding to the coordinate information of the input caused by the pen. The digitizer 1161-3 may generate, as a data value, an electromagnetic variation caused by the input. The digitizer 1161-3 may sense an input caused by the passive pen, or may transmit or receive data to or from the active pen.

At least one of the fingerprint sensor 1161-1, the input sensor 1161-2, or the digitizer 1161-3 may be implemented as a sensor layer formed on the display panel 1141 through a continuous process. At least one of the fingerprint sensor 1161-1, the input sensor 1161-2, or the digitizer 1161-3 may be disposed on an upper side of the display panel 1141, and the other sensor module 1161 among the fingerprint sensor 1161-1, the input sensor 1161-2, and the digitizer 1161-3 (for example, the digitizer 1161-3) may be disposed on a lower side of the display panel 1141.

At least two of the fingerprint sensor 1161-1, the input sensor 1161-2, and the digitizer 1161-3 may be integrated into one sensing panel through the same manufacturing process. When at least two of the fingerprint sensor 1161-1, the input sensor 1161-2, and the digitizer 1161-3 are integrated into one sensing panel, the sensing panel may be placed between the display panel 1141 and the window disposed above the display panel 1141. As another example, the sensing panel may be disposed on the window. However, the position of the sensing panel is not particularly limited thereto.

At least one of fingerprint sensor 1161-1, the input sensor 1161-2, or the digitizer 1161-3 may be embedded in the display panel 1141. That is, at least one of fingerprint sensor 1161-1, the input sensor 1161-2, or the digitizer 1161-3 may be simultaneously formed through a process of forming elements (e.g., a light emitting element, a transistor, and the like) included in the display panel 1141.

In addition, the sensor module 1161 may generate an electrical signal or a data value, which corresponds to an internal state or an external state of the electronic device 1000. The sensor module 1161 may further include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1162 may include one or more antennas for transmitting a signal or power to the outside or receiving a signal or power from the outside. In accordance with an embodiment, the communication module 1173 may transmit a signal to the external electronic device or receive a signal from the external electronic device through an antenna suitable for a communication scheme. An antenna pattern of the antenna module 1162 may be integrated in one component (e.g., the display panel 1141) of the display module 1140, the input sensor 1161-2, or the like.

The sound output module 1163 is a device for outputting a sound signal to the outside of the electronic device 1000, and may include, for example, a speaker used for a general purpose such as multimedia playback or transcription playback and a receiver used for only call reception. In accordance with an embodiment, the receiver may be integrally formed with the speaker or be formed separately from the speaker. A sound output pattern of the sound output module 1163 may be integrated in the display module 1140.

The camera module 1171 may capture a still image and a moving image. In accordance with an embodiment, the camera module 1171 may include one or more lenses, an image sensor, or an image signal processor. The camera module 1171 may further include an infrared camera capable of measuring the existence of the user, a position of the user, eyes of the user, or the like.

The light module 1172 may provide light. The light module 1172 may include a light emitting diode or a xenon lamp. The light module 1172 may operate in association with the camera module 1171 or operate independently from the camera module 1171.

The communication module 1173 may establish a wired or wireless communication channel between the electronic device 1000 and the external electronic device 2000, and support communication through the established communication channel. The communication module may include any one or all of a wireless communication module such as a cellular communication module, a short-range wireless communication module, or a global navigation satellite system (GNSS) communication module, and a wired communication module such as a local area network (LAN) communication module or a power line communication (PLC) module. The communication module 1173 may communicate with the external electronic device 2000 through a short-range communication network such as Bluetooth™, wireless-fidelity (WiFi) direct, or infrared data association (IrDA), or a long-range communication network such as a cellular network, Internet, or a computer network (e.g., LAN or wide area network (WAN)). The above-described several kinds of communication modules may be implemented into one chip or be respectively implemented as separate chips.

The input module 1130, the sensor module 1161, the camera module 1171, and the like may be used to control an operation of the display module 1140 in association with the processor 1110.

The processor 1110 may output a command or data to the display module 1140, the sound output module 1163, the camera module 1171, or the light module 1172, based on input data received from the input module 1130. For example, the processor 1110 may generate image data, corresponding to input data applied through a mouse, an active pen, or the like, and output the image data to the display module 1140. The processor 1110 may generate command data, corresponding to the input data, and output the command data to the camera module 1171 or the light module 1172. When no input data is received from the input module 1130, the processor 1110 may change the operation mode of the electronic device 1000 to a low power mode or a sleep mode, thereby reducing power consumed in the electronic device 1000.

The processor 1110 may output a command or data to the display module 1140, the sound output module 1163, the camera module 1171, or the light module 1172, based on sensing data received from the sensor module 1161. For example, the processor 1110 may compare the input data acquired through the fingerprint sensor 1161-1 with authentication data stored in the memory 1120, and execute an application according to a comparison result. The processor 1110 may execute a command or output corresponding image data to the display module 1140, based on sensing data sensed by the input sensor 1161-2 or the digitizer 1161-3. When a temperature sensor is included in the sensor module 1161, the processor 1110 may receive temperature data from the sensor module 1161, and further perform luminance correction on image data, based on the temperature data.

The processor 1110 may receive measurement data about existence of the user, a position of the user, eyes of the user, or the like from the camera module 1171. The processor 1110 may further perform luminance correction on image data, based on the measurement data. For example, the processor 1110 which decides the existence of the user through an input from the camera module 1171 may output image data, whose luminance is corrected through the data conversion circuit 1112-2 or the gamma correction circuit 1112-3, to the display module 1140.

At least some of the above-described components may be connected to each other through an inter-peripheral communication scheme, e.g., a bus, a general purpose input/output (GPIO), a serial peripheral interface (SPI), a mobile industry processor interface (MIPI), or an ultra path interconnect (UPI) link. The processor 1110 may communicate with the display module 1140 through a predefined interface, or through any one of the above-described communication schemes. However, the present disclosure is not limited to the above-described communication schemes.

In the driving circuit and the display device including the same, and the electronic device in accordance with the present disclosure, areas of the display unit can be driven at different driving frequencies, thereby reducing the power consumption. Further, according to an embodiment, although an enable signal is differently supplied to each of the areas of the display unit, a scan signal can be stably supplied, and thus the reliability of driving can be ensured.

Although specific terms are employed to explain an embodiment of the present disclosure, it will be understood that they are used, or should be interpreted, in a generic and descriptive sense only and not for the purpose of limitation. As would be apparent to one of ordinary skill in the art as of the filing of the present application, features, characteristics, or elements described in connection with a particular example of an embodiment of the present disclosure may be used singly or in combination with features, characteristics, or elements described in connection with other examples of the embodiment of the present disclosure unless otherwise specifically indicated. Accordingly, it will be understood by those of skill in the art that various changes in form and details may be made without departing from the spirit and scope of the present disclosure as set forth in the following claims.

What is claimed is:

1. A driving circuit comprising:

an emission driver including a plurality of emission stage circuits, each of the plurality of emission stage circuits including an emission output unit outputting an emission control signal in response to a voltage of each of a first node and a second node, and a first emission transistor connected between a third node electrically connected to the first node and an input terminal;

a compensation driver including a plurality of compensation stage circuits to generate a compensation scan signal;

an initialization driver including a plurality of initialization stage circuits to generate an initialization scan signal; and an output controller including a plurality of control stage circuits, each of the plurality of control stage circuits including a first control transistor and a second control transistor, which are connected in series between a main power input terminal and an output terminal, and a third control transistor and a fourth control transistor, which are connected in series between the output terminal and a second power input terminal, wherein the second control transistor and the third control transistor are turned on or turned off in response to an enable signal and output a masking signal which controls an output of the compensation scan signal and the initialization scan signal.

2. The driving circuit of claim 1, wherein a gate electrode of the first control transistor included in an i-th (i is a natural number of 1 or more) control stage circuit is connected to a third node of an i-th emission stage circuit, and a gate electrode of the fourth control transistor in the i-th control stage circuit is connected to a second node of the i-th emission stage circuit.

3. The driving circuit of claim 1, wherein each of the plurality of control stage circuits further includes a capacitor connected between the output terminal and a third power input terminal.

4. The driving circuit of claim 1, wherein each of the third control transistor and the fourth control transistor includes a body electrode, and the body electrode of each of the third control transistor and the fourth control transistor is connected to a third power input terminal.

5. The driving circuit of claim 4, wherein a logic high level voltage is input to the main power input terminal, and a logic low level voltage is input to the second power input terminal and the third power input terminal.

6. The driving circuit of claim 5, wherein a voltage input to the second power input terminal is higher than a voltage input to the third power input terminal.

7. The driving circuit of claim 1, wherein each of the first control transistor and the second control transistor is a P-type transistor, and each of the third control transistor and the fourth control transistor is an N-type transistor.

8. The driving circuit of claim 1, wherein each of the plurality of emission stage circuits outputs a high level emission control signal when the first node and the third node have a logic high level voltage, and the second node has a logic low level voltage.

9. The driving circuit of claim 1, wherein each of the plurality of compensation stage circuits and the plurality of initialization stage circuits includes:

a first output unit configured to output a carry signal in response to a voltage of each of a first control node and a second control node;

a second output unit configured to output the compensation scan signal or the initialization scan signal in response to a voltage of each of the first control node and a third control node; and a masking unit connected between the second control node and the third control node, the masking unit controlling an electrical connection between the second control node and the third control node in response to the masking signal.

10. The driving circuit of claim 9, wherein the masking unit includes:

a first masking transistor connected between the second control node and the third control node, the first masking transistor including a gate electrode receiving the masking signal; and a second masking transistor connected between the main power input terminal and the third control node, the second masking transistor including a gate electrode receiving the masking signal, wherein the first masking transistor is a P-type transistor, and the second masking transistor is an N-type transistor.

11. A display device comprising:

a display unit including pixels connected to scan lines, emission control lines, and data lines;

an emission driver including emission stage circuits to supply an emission control signal to each of the emission control lines;

a compensation driver including compensation stage circuits to supply a compensation scan signal to each of compensation scan lines among the scan lines;

an initialization driver including initialization stage circuits to supply an initialization scan signal to each of initialization scan lines among the scan lines;

a timing controller configured to control the emission driver, the compensation driver, and the initialization driver; and an output controller including control stage circuits, each of the control stage circuits outputting a masking signal to the compensation driver or the initialization driver, to control an output of the compensation scan signal or the initialization scan signal, in response to an internal voltage of the emission stage circuits and an enable signal supplied from the timing controller.

12. The display device of claim 11, wherein the display unit is divided into a plurality of areas, and the timing controller drives the plurality of areas at different driving frequencies by controlling the enable signal to have a first level or a second level.

13. The display device of claim 11, wherein each of the emission stage circuits includes an emission output unit outputting the emission control signal in response to a voltage of each of a first node and a second node, and a first emission transistor connected between a third node electrically connected to the first node and an input terminal.

14. The display device of claim 13, wherein an i-th (i is a natural number of 1 or more) control stage circuit outputs the masking signal which controls the output of the compensation scan signal of an i-th compensation stage circuit and the initialization scan signal of an i-th initialization stage circuit in response to a voltage of each of the second node and the third node of an i-th emission stage circuit and a voltage of the enable signal.

15. The display device of claim 14, wherein the i-th control stage circuit includes:

a first control transistor and a second control transistor, connected in series between a main power input terminal and an output terminal to which the masking signal is output;

a third control transistor and a fourth control transistor, connected in series between the output terminal and a second power input terminal; and a capacitor connected between the output terminal and a third power input terminal, wherein a gate electrode of the first control transistor is connected to the third node of the i-th emission stage circuit, and a gate electrode of the fourth control transistor is connected to the second node of the i-th emission stage circuit.

16. The display device of claim 15, wherein a gate electrode of each of the second control transistor and the third control transistor is supplied with the enable signal.

17. The display device of claim 15, wherein each of the third control transistor and the fourth control transistor includes a body electrode, and the body electrode of each of the third control transistor and the fourth control transistor is connected to the third power input terminal, and wherein a voltage of a second power source supplied to the second power input terminal is higher than a voltage of a third power source supplied to the third power input terminal.

18. The display device of claim 15, wherein each of the first control transistor and the second control transistor is a P-type transistor, and each of the third control transistor and the fourth control transistor is an N-type transistor.

19. The display device of claim 14, wherein each of the compensation stage circuits and the initialization stage circuits includes:

a first output unit configured to output a carry signal in response to a voltage of each of a first control node and a second control node;

a second output unit configured to output the compensation scan signal or the initialization scan signal in response to a voltage of each of the first control node and a third control node; and a masking unit connected between the second control node and the third control node, the masking unit controlling an electrical connection between the second control node and the third control node in response to the masking signal.

20. The display device of claim 19, wherein the masking unit includes:

a first masking transistor connected between the second control node and the third control node, the first masking transistor including a gate electrode receiving the masking signal; and a second masking transistor connected between the main power input terminal and the third control node, the second masking transistor including a gate electrode receiving the masking signal, wherein the first masking transistor is a P-type transistor, and the second masking transistor is an N-type transistor.

21. An electronic device comprising:

a display panel including pixels, the display panel having a plurality of areas;

an emission driver including emission stage circuits to supply an emission control signal to each of emission control signal lines;

a controller configured to supply an enable signal;

a gate driver including a compensation driver including compensation stage circuits to supply a compensation scan signal to each of compensation scan lines, and an initialization driver including initialization stage circuits to supply an initialization scan signal to each of initialization scan lines; and an output controller including control stage circuits controlling an output of the compensation scan signal and the initialization scan signal in response to an internal voltage of the emission stage circuits and an enable signal supplied to the timing controller, wherein each of the control stage circuits includes a first control transistor and a second control transistor, which are connected in series between a main power input terminal and an output terminal, and a third control transistor and a fourth control transistor, which are connected in series between the output terminal and a second power input terminal.

22. The electronic device of claim 21, wherein the electronic device is one of a mobile phone, a tablet, a mobile communication terminal, an electronic notebook, an e-book, a portable multimedia player, a navigation device, an ultra mobile personal computer, a television, a laptop, a monitor, a billboard, an Internet of Things device, a smart watch, a watch phone, glasses, a head mounted display a vehicle dashboard, a vehicle mirror display, or a vehicle entertainment display.

* * * * *